US008471998B2

(12) United States Patent
Ishii et al.

(10) Patent No.: US 8,471,998 B2
(45) Date of Patent: Jun. 25, 2013

(54) LIQUID CRYSTAL DISPLAY ELEMENT, DISPLAY DEVICE, AND METHOD FOR DRIVING THE SAME

(75) Inventors: Yuko Ishii, Kanagawa (JP); Ken Sumiyoshi, Kanagawa (JP); Kenichi Takatori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 225 days.

(21) Appl. No.: 12/784,907

(22) Filed: May 21, 2010

(65) Prior Publication Data

US 2010/0328594 A1    Dec. 30, 2010

(30) Foreign Application Priority Data

Jun. 30, 2009    (JP) ................................ 2009-156276

(51) Int. Cl.
 *C09K 19/02* (2006.01)
 *G02F 1/133* (2006.01)
 *G02F 1/1347* (2006.01)

(52) U.S. Cl.
 USPC ................. 349/182; 349/20; 349/73; 349/74; 349/78

(58) Field of Classification Search
 USPC ................. 349/20, 33, 72–74, 77–79, 83, 90, 349/156–157, 161, 167–169, 182
 See application file for complete search history.

(56) References Cited

U.S. PATENT DOCUMENTS

| 7,286,198 B2 * | 10/2007 | Wang et al. ................... 349/114 |
| 7,843,530 B2 * | 11/2010 | Hiji et al. ........................ 349/86 |
| 2004/0141119 A1 * | 7/2004 | Iijima ........................... 349/114 |
| 2006/0023146 A1 * | 2/2006 | Yang et al. .................... 349/114 |
| 2009/0310063 A1 * | 12/2009 | Yoon et al. ...................... 349/61 |

FOREIGN PATENT DOCUMENTS

| JP | 05-173153 | 7/1993 |
| JP | 07-028037 | 1/1995 |
| JP | 08-254716 | 10/1996 |
| JP | 10-161129 | 6/1998 |
| JP | 2000-267120 | 9/2000 |
| JP | 2004-117404 | 4/2004 |

OTHER PUBLICATIONS

Liquid Crystal Display, first edition, p. 9-15, edited by the Institute of Television Engineers of Japan under the supervision of Takanori Okoshi and published by SHOKODO Co., Ltd. Jul. 1985 (ISBN-10: 4-7856-9018-6.
Japanese Office Action dated Feb. 19, 2013 in corresponding Japanese Patent Application No. 2009-156276 with English translation of enclosed wavy lined portions.

* cited by examiner

*Primary Examiner* — Bumsuk Won
*Assistant Examiner* — Charles Chang
(74) *Attorney, Agent, or Firm* — Young & Thompson

(57) ABSTRACT

A liquid crystal display element includes a liquid crystal composition sandwiched between substrates, wherein at least two types of liquid crystal compositions which exhibit liquid crystal phase in different temperature ranges are contained within each one pixel, and each of the at least two types of liquid crystal compositions is sealed and isolated within each pixel.

10 Claims, 33 Drawing Sheets

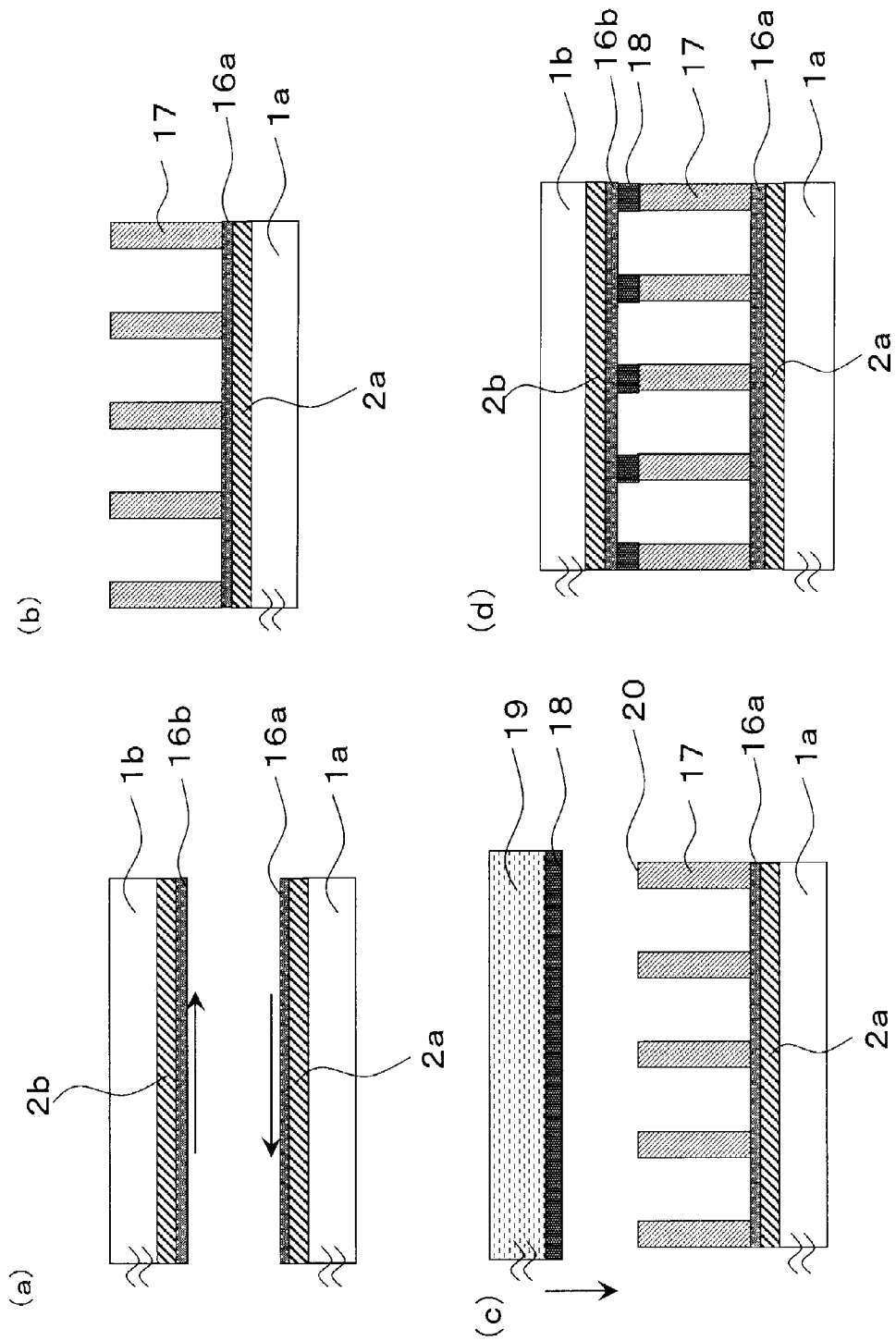

FIG.12
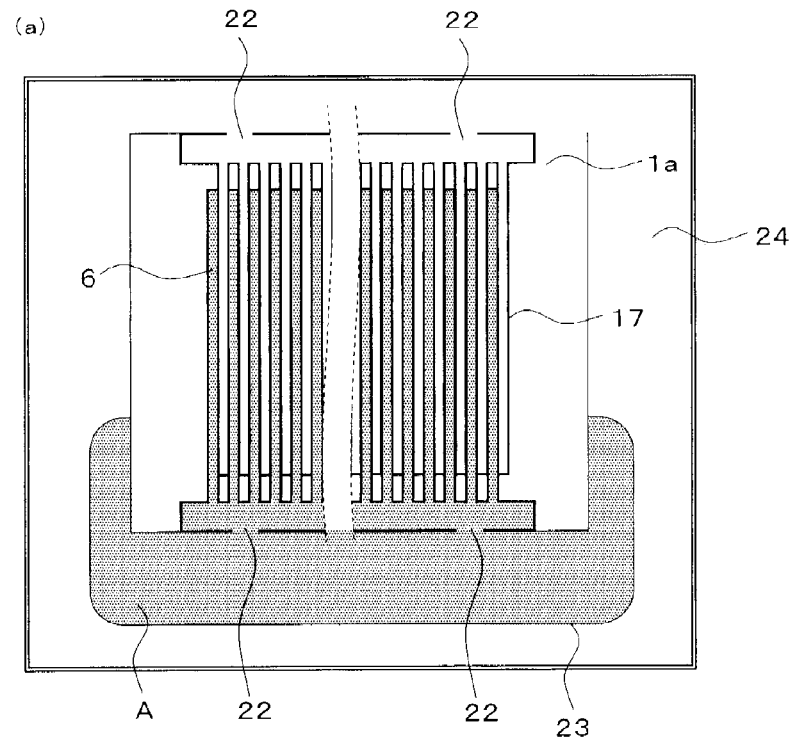
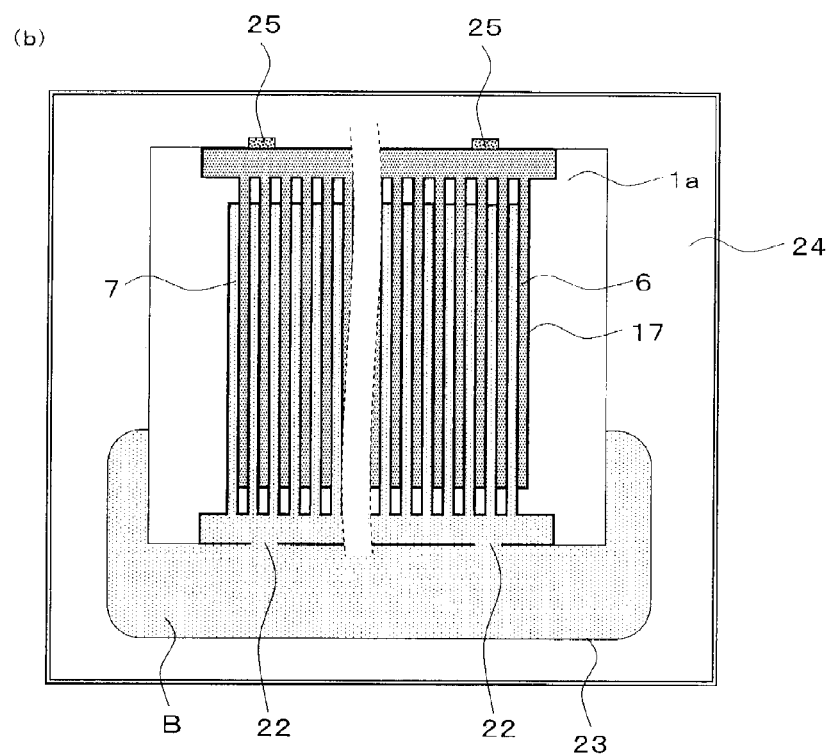

LIQUID CRYSTAL DISPLAY ELEMENT, DISPLAY DEVICE, AND METHOD FOR DRIVING THE SAME

This application is based upon and claims the benefit of priority from Japanese patent application No. 2009-156276, filed on Jun. 30, 2009, the disclosure of which is incorporated herein in its entirety by reference.

BACKGROUND OF THE INVENTION

1. Field of the Invention

The present invention relates to a liquid crystal display element, a display device, and a method for driving the display device.

2. Description of Related Art

In recent years, there have been diversified demands for display devices. Display devices that can be used in various temperature environments have been demanded, for example, display devices such as car navigation systems mounted in cars and display devices mounted in airplanes.

On the other hand, a liquid crystal, utilized in a liquid crystal display device, has physical property values depending on temperature. In particular, in a low-temperature environment, the liquid crystal exhibits the property of having its viscosity increased and its response speed reduced. Thus, disadvantageously, the display quality of the liquid crystal display device such as contrast may be degraded in a low-temperature environment.

In a known method, when a liquid crystal is applied to a display device, at least two types of compounds are mixed together to increase a temperature range corresponding to a liquid crystal phase (for example, "Liquid Crystal Display", first edition, p. 9-15, edited by the Institute of Television Engineers of Japan under the supervision of Takanori Okoshi and published by SHOKODO Co., Ltd., July 1985 (ISBN-10: 4-7856-9018-6)).

Furthermore, another means for solving the above-described problem is disclosed in JP05-173153A. Now, the structure of a liquid crystal display device disclosed in JP05-173153A will be described with reference to FIG. 34.

In a liquid crystal display element 100 in the display device described in JP05-173153A, a heater electrode layer 102b is provided on one surface of a glass substrate 101b. An insulating film 103b, a transparent electrode layer 104b, an insulating film 105b, and an orientation film 106b are provided on the other surface of the glass substrate 101b in this order. On another glass substrate 101a, a color filter 107a, an insulating film 103a, a transparent electrode layer 104a, an insulating film 105a, and an orientation film 106a are provided in this order. The glass substrate 101a and the glass substrate 101b are arranged such that the orientation film 106a is located opposite the orientation film 106b. A liquid crystal 108 is filled between the orientation film 106a and the orientation film 106b.

The heater electrode layer is formed of a large number of rectangular electrodes disposed laterally in parallel, preferably parallel to the direction of shorter sides of the element. Furthermore, the heater electrode layer is divided into at least three independent heating areas. The rectangular electrodes in each of the heating areas are coupled together at the opposite ends of the electrodes by metal electrode terminals. Each of the rectangular electrodes forming the heater electrode layer is composed of a conductive transparent film such as ITO. The whole liquid crystal display element can be controlled to a uniform temperature by varying a voltage applied to the heater electrode layer between a central region of the liquid crystal display element and regions located at the opposite ends of the liquid crystal display element.

As described above, the display device described in JP05-173153A includes the heater incorporated in the liquid crystal display element. The display device thus allows the temperature of the liquid crystal in the liquid crystal display element (display panel) to be controlled in such a manner that the temperature is not affected by an environmental temperature.

SUMMARY

However, as disclosed in "Liquid Crystal Display", first edition, p. 9-15, edited by the Institute of Television Engineers of Japan under the supervision of Takanori Okoshi and published by SHOKODO Co., Ltd., July 1985 (ISBN-10: 4-7856-9018-6), in the method in which at least two types of liquid crystal compositions are mixed together to form a liquid crystal mixture, the temperature characteristics of each of the liquid crystal compositions are not maintained. Thus, if favorable characteristics are required over a wider temperature range particularly as in the case of applications in cold regions, it is difficult to meet such a requirement simply by appropriately designing the liquid crystal material.

Furthermore, when used in a harsh low-temperature environment, the display device disclosed in JP05-173153A requires constant energization of the heater in order to maintain the optimum panel temperature. This increases power consumption.

Thus, an exemplary object of the invention is to provide a liquid display element which enables the above-described problems to be solved, that is, which is unlikely to be affected by a variation in temperature even in various temperature environments, thus allowing stable display quality to be maintained, as well as a display device including the liquid crystal display element and a method for driving the display device.

According to an exemplary aspect of the invention, there is provided a liquid crystal display element including a liquid crystal composition sandwiched between substrates, wherein at least two types of liquid crystal compositions which exhibit liquid crystal phase in different temperature ranges are contained within each one pixel, and each of the at least two types of liquid crystal compositions is sealed and isolated within each pixel.

According to another exemplary aspect of the invention, there is provided a liquid crystal display device including:

the above-described liquid crystal display element;

a backlight;

a temperature sensor; and a liquid crystal drive circuit configured to controllably drive each of the liquid crystal compositions in the liquid crystal display element based on a signal output by the temperature sensor.

According to another exemplary aspect of the invention, there is provided a method for driving a liquid crystal display device, wherein the device includes the above-described liquid crystal display element, a backlight, a temperature sensor, and a liquid crystal drive circuit configured to controllably drive each of the liquid crystal compositions in the liquid crystal display element based on a signal output by the temperature sensor, and the method includes detecting a usage environment temperature by using the temperature sensor, and selecting and driving at least one type of liquid crystal composition which exhibits liquid crystal phase at the usage environment temperature.

BRIEF DESCRIPTION OF THE DRAWINGS

FIG. 10 is a sectional view sequentially showing steps of a method for manufacturing the liquid crystal-containing layer structure in the liquid crystal display element according to the first exemplary embodiment of the invention;

FIG. 12 is a sectional view showing a method for injecting liquid crystal compositions of the liquid crystal display element according to the first exemplary embodiment of the invention;

DETAILED DESCRIPTION OF EMBODIMENTS

A liquid crystal display element according to an exemplary embodiment of the invention includes: paired substrates; a liquid crystal-containing layer sandwiched between the paired substrates; and an electrode formed on at least one of the paired substrates, wherein the liquid crystal-containing layer contains, within each one pixel, at least two types of liquid crystal compositions with different temperature ranges within which the respective liquid crystal compositions exhibit liquid crystal phase, and each of the at least two types of liquid crystal compositions is sealed and isolated within each pixel in the liquid crystal-containing layer.

The liquid crystal display element according to the present exemplary embodiment will be described with reference to FIG. 1 to FIG. 4.

Figure 1:
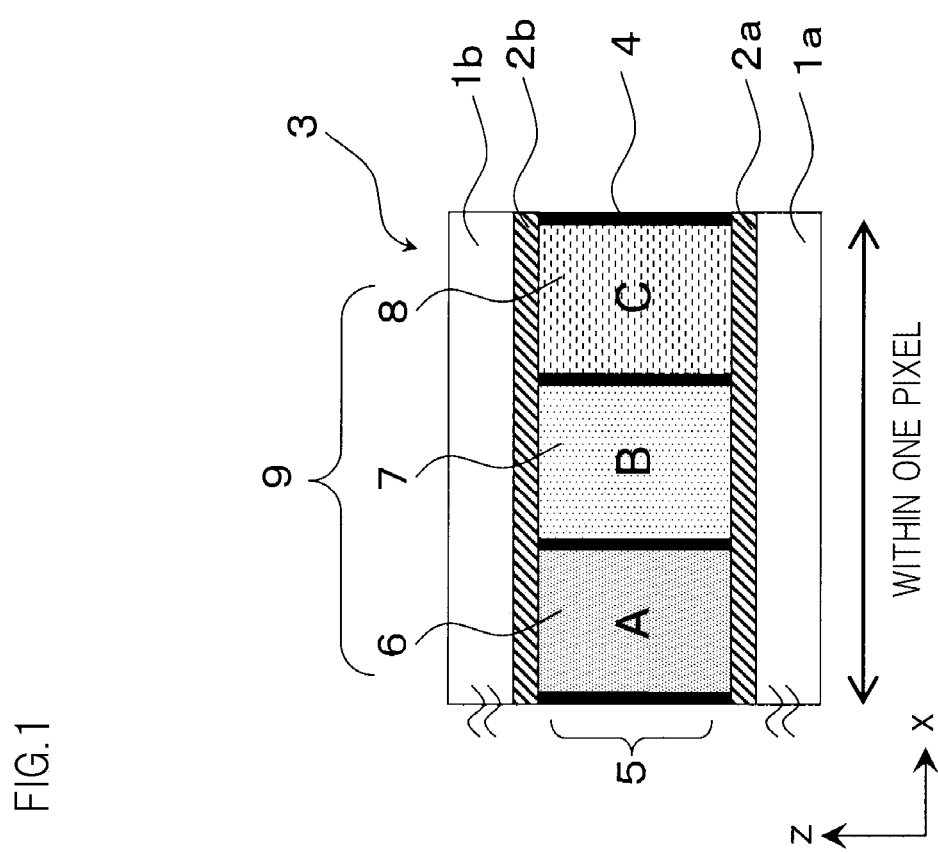
FIG. 1 is a sectional view showing a liquid crystal-containing layer structure in a liquid crystal display element according to an exemplary embodiment of the invention.

As shown in FIG. 1, a liquid crystal-containing layer 5 in a liquid crystal display element 3 is composed of liquid crystal composition groups 9 including an area 6 of a liquid crystal composition A, an area 7 of a liquid crystal composition B, and an area 8 of a liquid crystal composition C. The liquid crystal compositions A, B, and C of the liquid crystal composition group 9 are arranged within one pixel in the direction of an X axis (the planar direction of substrates). Each of the liquid crystal compositions is sealed and isolated in a closed isolated container (cell) 4. The liquid crystal-containing layer 5 is sandwiched between substrates 1a, 1b. Transparent electrodes 2a, 2b are provided on the substrates 1a, 1b.

Figure 2A:
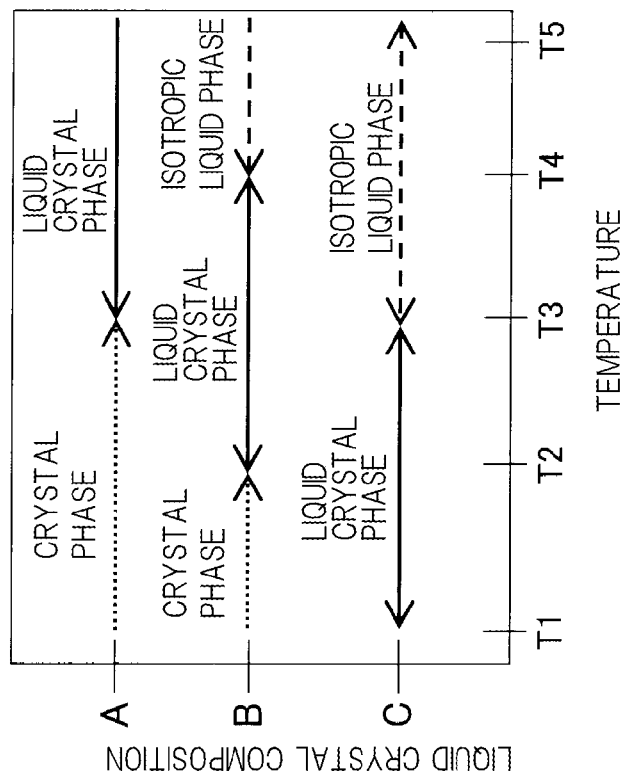
FIGS. 2A and 2B are phase diagrams of liquid crystal compositions used in liquid crystal display elements according to the exemplary embodiment of the invention.
Figure 2B:
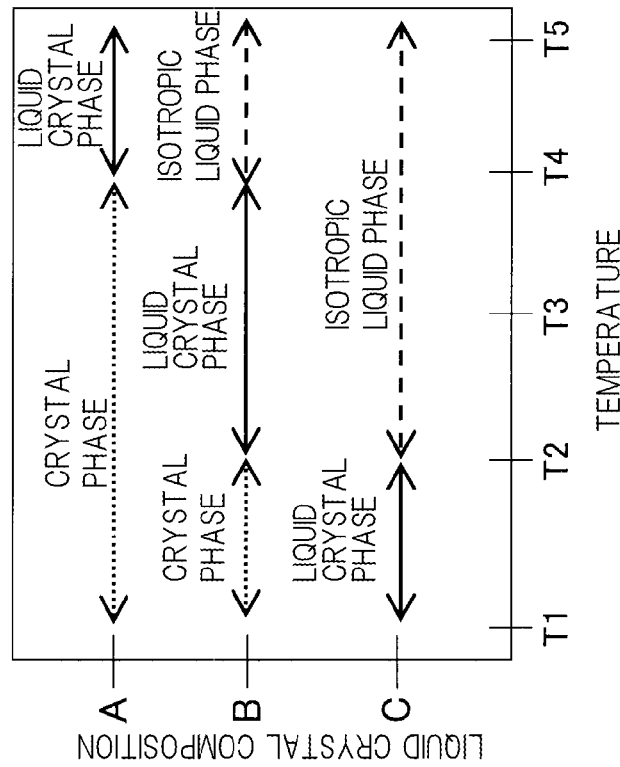

In each liquid crystal composition group 9, as shown in FIGS. 2A and 2B, the liquid crystal compositions A, B, and C have different temperature ranges within which the respective liquid crystal compositions exhibit liquid crystal phase. The temperatures T1 to T5 in FIGS. 2A and 2B meet the condition T1<T2<T3<T4<T5.

First, an example will be described in which the temperature ranges within which the respective liquid crystal compositions of the liquid crystal composition group 9 exhibit liquid crystal phase are as shown in FIG. 2A. The temperature range within which the liquid crystal compositions each exhibit liquid crystal phase is hereinafter referred to as the "liquid crystal phase temperature range". The liquid crystal composition A exhibits liquid crystal phase between the temperature T4 and the temperature T5. The liquid crystal composition B exhibits liquid crystal phase between the temperature T2 and the temperature T4. The liquid crystal composition C exhibits liquid crystal phase between the temperature T1 and the temperature T2. If the environmental temperature (hereinafter referred to as the "usage environment temperature T0") at which the liquid crystal display element in the present example is used is between the temperature T2 and the temperature T3, application of a voltage to transparent electrodes 2a and 2b allows the liquid crystal composition B to be driven. This is because at the usage environment temperature, the liquid crystal composition B is in liquid crystal phase. Between the temperature T2 and the temperature T3, the liquid crystal composition A exhibits crystal phase, whereas the liquid crystal composition C exhibits isotropic liquid phase. Thus, the liquid crystal compositions A and C are not driven even with the applied voltage.

Figure 3:
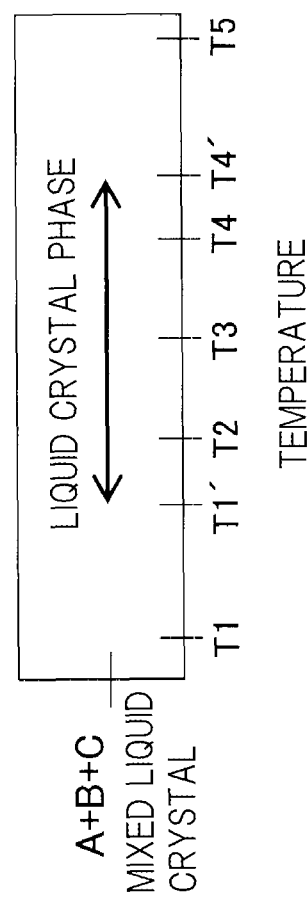
FIG. 3 is a phase diagram of liquid crystal compositions in a related liquid crystal display element.
Figure 4:
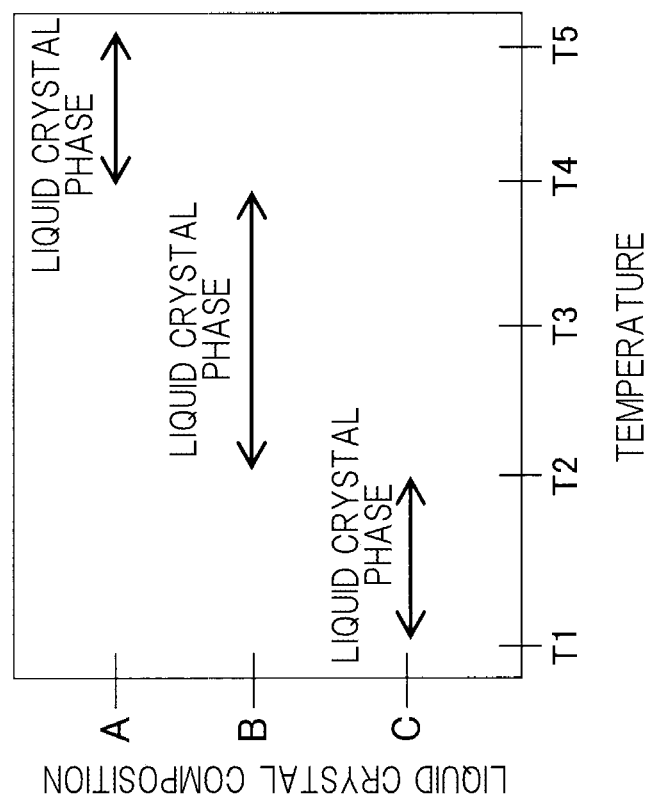
FIG. 4 is a phase diagram of liquid crystal compositions used in the liquid crystal display element according to the exemplary embodiment of the invention.

If the liquid crystal compositions A, B, and C of the liquid crystal composition group 9 are mixed together, the temperature characteristics of each of the liquid crystal compositions are not maintained. As shown in FIG. 3, the liquid crystal phase temperature range of the mixed liquid crystal is between a temperature T1' and a temperature T4' and is narrower than the range between the temperature T1 and the temperature T4. The mixed liquid crystal can thus be driven only between the temperature T1' and the temperature T4'. However, in the present exemplary embodiment, as shown in FIG. 2A and FIG. 4, the liquid crystal composition C exhibits liquid crystal phase between the temperature T1 and the temperature T2. The liquid crystal composition B exhibits liquid crystal phase between the temperature T2 and the temperature T4. The liquid crystal composition A exhibits liquid crystal phase between the temperature T4 and the temperature T5. Thus, the liquid crystal display element 3 that can be driven between the temperature T1 and the temperature T5 can be obtained. As a result, display can be performed over a wide temperature range.

In the above-described example, liquid crystal phase and isotropic liquid phase may be mixed within a pixel. Thus, in order to suppress a decrease in contrast ratio, a polarizer is desirably located in a crossed Nichol state.

As described above, each liquid crystal composition group 9 is provided within a very small range, that is, within one pixel. Thus, pixel portions operating within the different temperature ranges can be reliably provided. As a result, the same resolution can be maintained over a wide temperature range.

In a liquid crystal display element according to another exemplary embodiment of the invention, each of the above-described at least two types of liquid crystal compositions has a liquid crystal phase temperature range partly overlapping a liquid crystal phase temperature range of another liquid crystal composition in the same pixel. That is, each of the above-described at least two types of liquid crystal compositions has the liquid crystal phase temperature range including a temperature range portion common to the liquid crystal phase temperature range of another liquid crystal composition in the same pixel.

The liquid crystal display element according to the present exemplary embodiment will be described with reference to FIG. 2B by way of example.

As shown in FIG. 2B, each of the liquid crystal compositions in the liquid crystal composition group 9 has a liquid crystal phase temperature range partly common to that of another liquid crystal composition in the liquid crystal composition group 9. The liquid crystal composition A has a liquid crystal phase temperature range including a temperature range portion common to that of the liquid crystal composition B between the temperature T3 and the temperature T4. The liquid crystal composition C has a liquid crystal phase temperature range including a temperature range portion common to that of the liquid crystal composition B between the temperature T2 and the temperature T3. If the usage environment temperature T0 is between the temperature T2 and the temperature T3, application of a voltage to the transparent electrodes 2a and 2b allows the liquid crystal compositions B and C to be driven. This is because the liquid crystal compositions B and C exhibit liquid crystal phase. Thus, the liquid crystal composition group using the liquid crystal compositions shown in FIG. 2B has the common temperature ranges within which the plural types of liquid crystal compositions exhibit liquid crystal phase. The liquid crystal composition group thus allows more liquid crystal compositions to be driven than the liquid crystal composition group using the liquid crystal compositions shown in FIG. 2A. This increases a displayable pixel area, thus improving display luminance.

A liquid crystal display device according to another exemplary embodiment of the invention includes a liquid crystal display element, a backlight, a temperature sensor, and a liquid crystal drive circuit configured to controllably drive each of the liquid crystal compositions of the liquid crystal display element based on signals output by the temperature sensor.

The liquid crystal display device according to the present exemplary embodiment will be described with reference to FIG. 2B, FIG. 5, and FIG. 6 by way of example.

Figure 5:
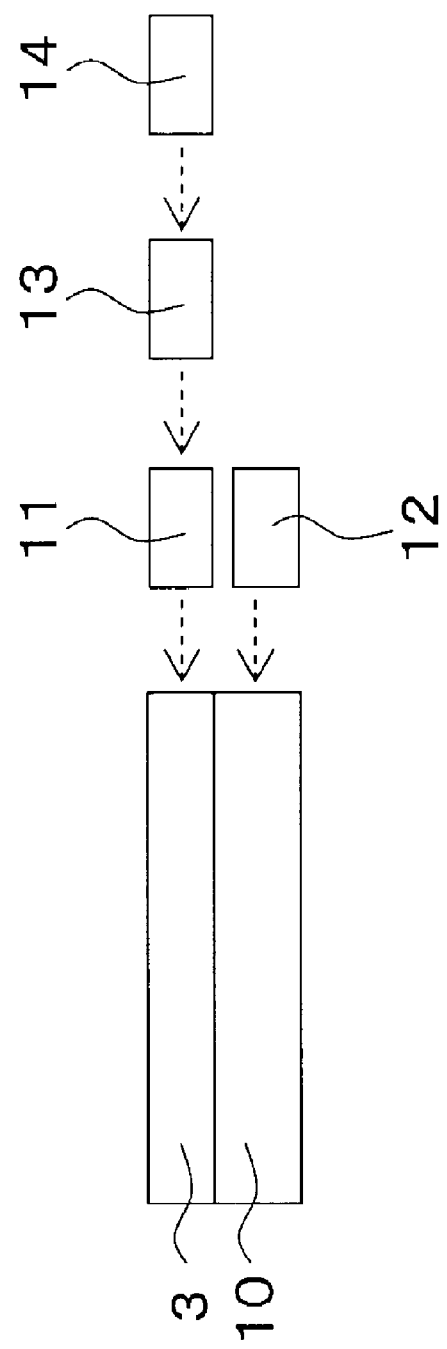
FIG. 5 is a schematic diagram showing the configuration of a liquid crystal display device according to the exemplary embodiment of the invention.
Figure 6:
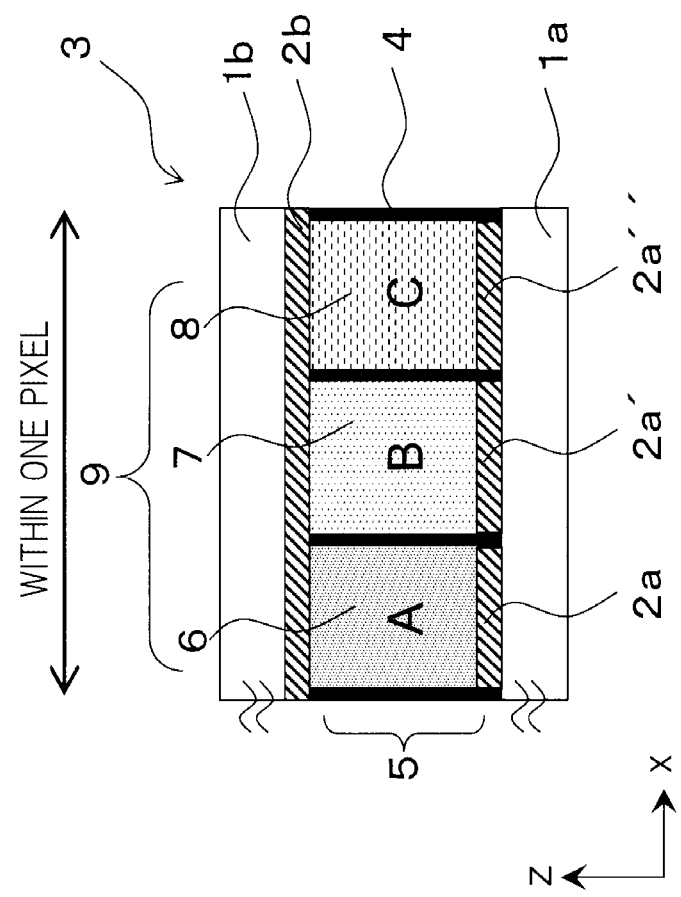
FIG. 6 is a sectional view showing a liquid crystal-containing layer structure in the liquid crystal display device according to the exemplary embodiment of the invention.

As shown in FIG. 5, the liquid crystal display device in the present example includes a liquid crystal display element 3, a backlight 10, a liquid crystal drive circuit 11, and a light source drive circuit 12. The liquid crystal drive circuit 11 includes an electrode selection circuit 13 and is connected to a temperature sensor 14. As shown in FIG. 6, in the liquid crystal display element 3 used in the liquid crystal display device in the present example, transparent electrodes 2a, 2a', and 2a" on one of the substrates are separately arranged in association with the respective types of liquid crystal compositions A, B, and C. The temperature sensor 14 detects the usage environment temperature T0 to output a signal indicating the usage environment temperature T0. The signal is input to the electrode selection circuit 13. The electrode selection circuit 13 compares the preset liquid crystal phase temperature ranges of the liquid crystal composition group 9 with the usage environment temperature T0 to select at least one type of liquid crystal composition to be driven. The electrode selection circuit 13 then outputs a signal to the liquid crystal drive circuit 11 so that the liquid crystal drive circuit 11 drives only the selected one or more liquid crystal compositions. In accordance with the signal, the liquid crystal drive circuit 11 drives only the selected one or more liquid crystal compositions.

As described above, the physical property values of the liquid crystal compositions depend on temperature. In particular, at and near a phase transition point, a pretransitional phenomenon may occur to cause various physical property values to deviate, thus delaying the phase transition. Thus, for example, in the liquid crystal composition group 9 using the liquid crystal compositions shown in FIG. 2B, if the usage environment temperature T0 is between the temperature T3 and the temperature T4, the following may occur. When a voltage is applied to the liquid crystal composition C in the isotropic liquid phase and if the liquid crystal composition C partly exhibits liquid crystal phase at the phase transition, then the liquid crystal composition C may be slightly driven to affect the display quality. However, in the present exemplary embodiment, a voltage is applied only to the liquid crystal compositions definitely exhibiting liquid crystal phase. This enables the display quality to be prevented from being degraded by the application of a voltage to a liquid crystal composition that is in phase transition.

A liquid crystal display device according to another exemplary embodiment includes a liquid crystal display element, a backlight, a temperature sensor, a liquid crystal drive circuit configured to controllably drive each of the liquid crystal compositions of the liquid crystal display element based on signals output by the temperature sensor, and a light source drive circuit configured to control a light source for the backlight based on signals output by the temperature sensor.

The liquid crystal display device according to the present exemplary embodiment will be described with reference to FIG. 2B, FIG. 6 and FIG. 7 by way of example.

Figure 7:
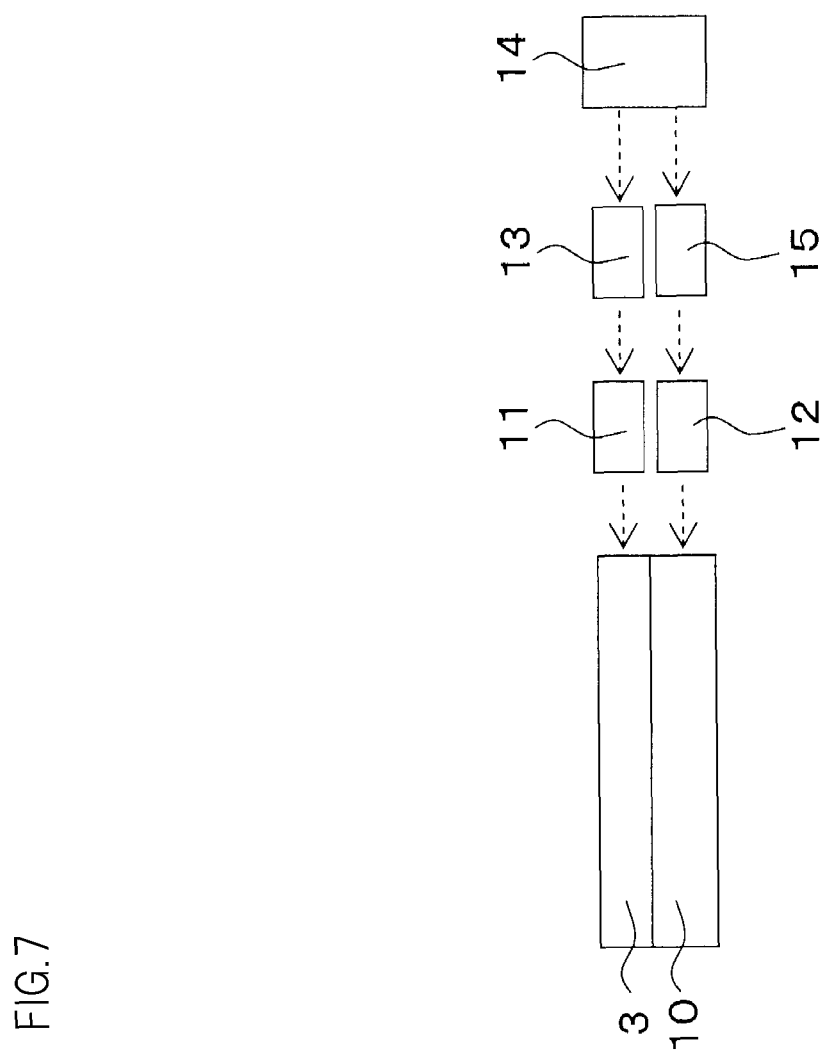
FIG. 7 is a schematic diagram showing the configuration of a liquid crystal display device according to the exemplary embodiment of the invention.

As shown in FIG. 7, the liquid crystal display device in the present example includes the liquid crystal display element 3, the backlight 10, the liquid crystal drive circuit 11, and the light source drive circuit 12. In the liquid crystal display element 3, as shown in FIG. 6, the transparent electrode on one of the substrates is separated into pieces in accordance with the types of the liquid crystal compositions. The liquid crystal drive circuit 11 includes the electrode selection circuit 13 and is connected to the temperature sensor 14. The light source drive circuit 12 includes a light quantity adjustment circuit 15 having a function to convert voltage into current, and is connected to the temperature sensor 14. The temperature sensor 14 detects the usage environment temperature T0 to output a signal indicating the usage environment temperature T0, to the electrode selection circuit 13 and the light quantity adjustment circuit 15. The electrode selection circuit 13 compares the preset liquid crystal phase temperature ranges of the liquid crystal composition group 9 with the usage environment temperature T0 to select at least one type of liquid crystal composition to be driven. The electrode selection circuit 13 then outputs a signal to the liquid crystal drive circuit 11 so that the liquid crystal drive circuit 11 drives the selected one or more liquid crystal compositions. In accordance with the signal, the liquid crystal drive circuit 11 drives only the selected one or more liquid crystal compositions. At the same time, the light quantity adjustment circuit 15 outputs a signal to the light source drive circuit 12 so as to adjust the luminance of the backlight in accordance with the usage environment temperature T0. In accordance with this signal, the light source drive circuit 12 adjusts the luminance of the light source for the back light 10. For example, in the liquid crystal composition group 9 shown in FIG. 2B, if the usage environment temperature T0 is between the temperature T1 and the temperature T2, only the liquid crystal composition C is selected as one that can be driven. Thus, the display luminance in this case may be lower than that in the case where plural types of liquid crystal compositions are simultaneously driven. However, according to the present exemplary embodiment, the light quantity adjustment circuit 15 adjustably increases the luminance of the light source for the backlight 10 in accordance with the usage environment temperature detected by the temperature sensor 14. Thus, the display luminance increases, allowing the appropriate display quality to be maintained.

Now, several specific examples of embodiments for carrying out the invention will be described in detail with reference to the drawings.

First Exemplary Embodiment

A first exemplary embodiment of the invention will be described with reference to FIG. 2A and FIG. 8 to FIG. 13B.

Figure 8:
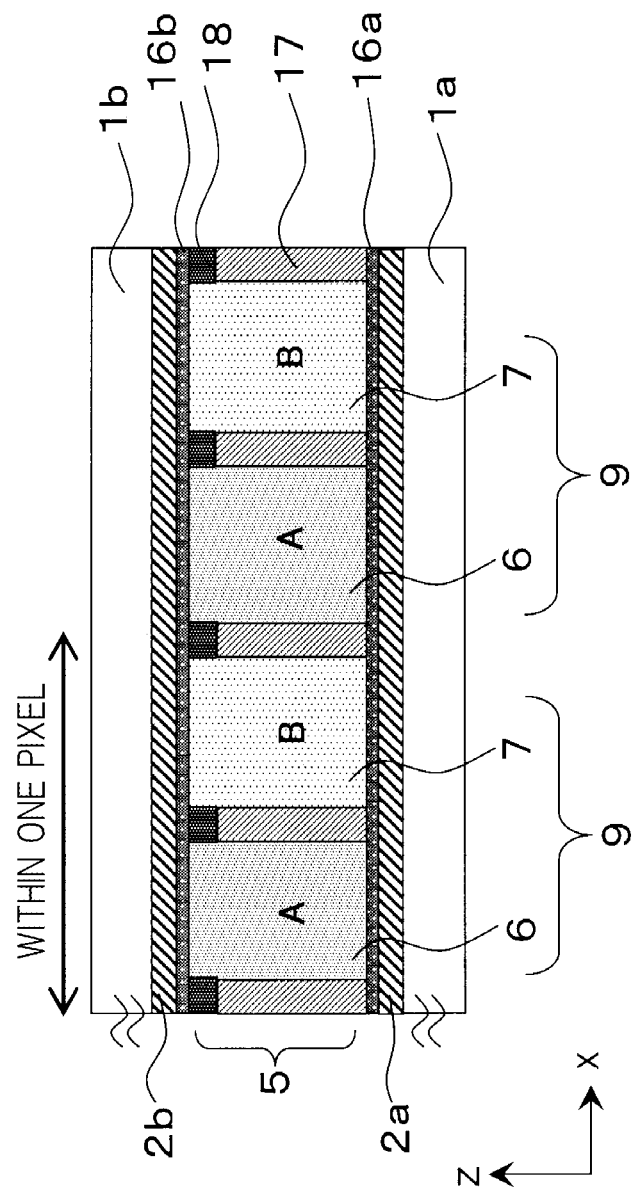
FIG. 8 is a sectional view showing a liquid crystal-containing layer structure in a liquid crystal display element according to a first exemplary embodiment of the invention.
Figure 9:
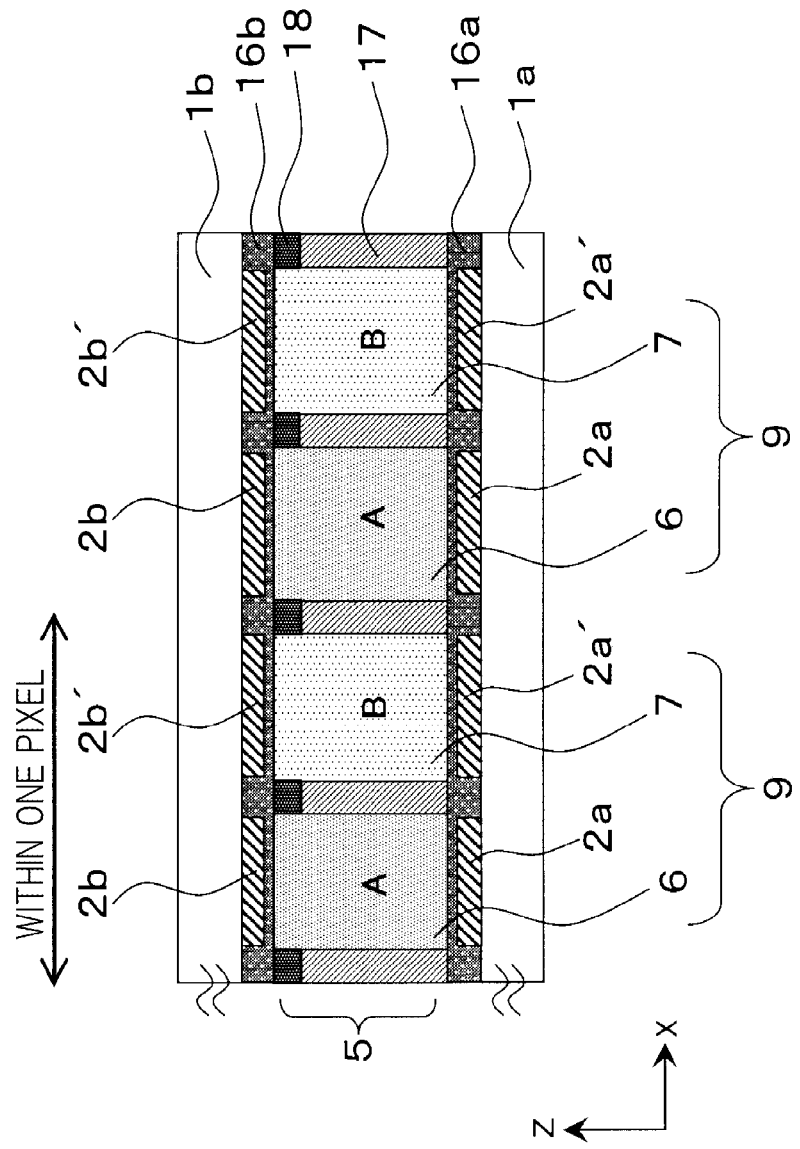
FIG. 9 is a sectional view showing a liquid crystal-containing layer structure in a liquid crystal display element according to the first exemplary embodiment of the invention.

FIG. 2A is a phase diagram of liquid crystal compositions used in the liquid crystal display element according to the present exemplary embodiment. FIGS. 8 and 9 are sectional views showing liquid crystal-containing layer structures in the liquid crystal display elements according to the present exemplary embodiment.

As shown in FIG. 8, a first substrate 1a on which a transparent electrode 2a and an orientation film 16a are formed is located opposite a second substrate 1b on which a transparent electrode 2b and an orientation film 16b are formed. A liquid crystal-containing layer 5 is sandwiched between the paired substrates 1a and 1b.

The liquid crystal-containing layer 5 includes two types of liquid crystal compositions A and B arranged within one pixel along the direction of the X axis. Each of the liquid crystal composition groups 9 include the area 6 of the liquid crystal composition A and the area 7 of the liquid crystal composition B, and the liquid crystal composition groups 9 are arranged along the direction of the X axis such that liquid crystal compositions A and B are alternately arranged. The liquid crystal compositions are partitioned by partition walls 17 and are each closed and isolated in a cell. The partition walls 17 are tightly contact with the second substrate 1b with an adhesive 18. As shown in FIG. 9, the transparent electrodes may be separately arranged for each liquid crystal composition such that the transparent electrodes 2a and 2b configured to drive the liquid crystal composition A are separated from transparent electrodes 2a' and 2b' configured to drive the liquid crystal composition B.

In the description below, the liquid crystal phase temperature range of the liquid crystal composition A is between a temperature T4 and a temperature T5, and the liquid crystal phase temperature range of the liquid crystal composition B is between a temperature T2 and the temperature T4 (FIG. 2A). Thus, the two types of liquid crystal compositions have different temperature ranges within which the respective liquid crystal compositions exhibit a liquid crystal phase. Examples of liquid crystal compositions exhibiting such characteristics are as follows. The liquid crystal composition A may be n-butyl-4-(4'-n-butylphenvlazo)-phenylcarbonate (liquid crystal phase temperature range: between 30° C. and 42° C.), and the liquid crystal composition B may be 4-(2-methylbutyl)benzoic acid-4'-n-hexyloxyphenyl ester (liquid crystal phase temperature range: between 24° C. and 30° C.).

Now, a method for manufacturing a liquid crystal-containing layer structure in the liquid crystal display element according to the present exemplary embodiment configured as described above will be described.

FIGS. 10(a) to (d) are sectional views sequentially showing steps of the method for manufacturing the liquid crystal-containing layer structure in the liquid crystal display element according to the present exemplary embodiment. FIG. 11A to FIG. 11D are plan views showing the shape of partition walls in the liquid crystal-containing layer structure in the liquid crystal display device according to the present exemplary embodiment.

First, as shown in FIG. 10(a), an orientation film 16a is formed on a substrate 1a with the transparent electrode 2a formed thereon. An orientation film 16b is formed on a substrate 1b with the transparent electrode 2b formed thereon. Each of the orientation films is formed by coating an application liquid on the substrate with a spin coater, prebaking the resulting film in order to remove an organic solvent, and then fully baking the film. After the orientation film is fully baked, orientation treatment is carried out depending on a liquid crystal orientation form. For example, the orientation films may be rubbed in the direction of an arrow in FIG. 10A.

Figure 11A:
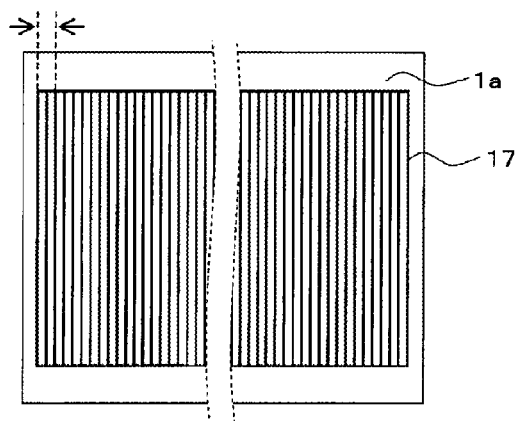
FIGS. 11A to 11D are plan views showing examples of the shape of partition walls in the liquid crystal-containing layer structure in the liquid crystal display element according to the first exemplary embodiment of the invention.
Figure 11B:
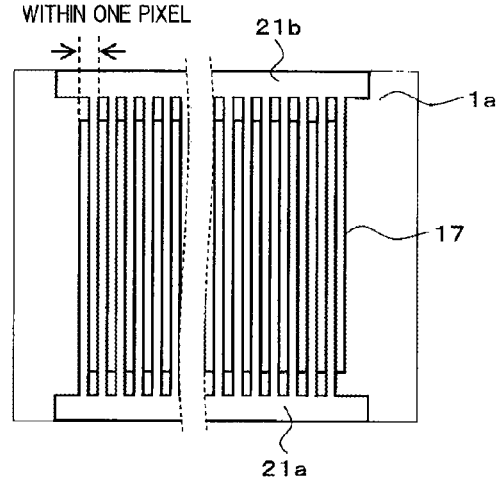
Figure 11C:
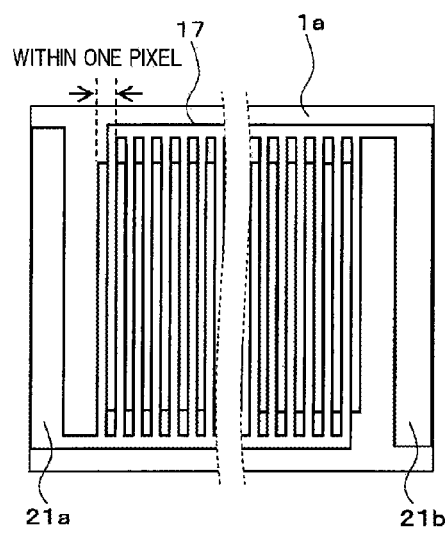
Figure 11D:
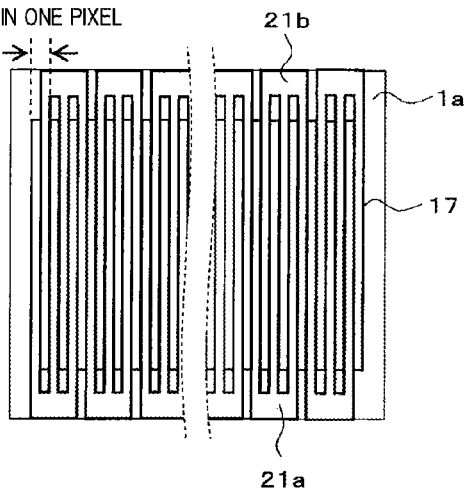

Then, as shown in FIG. 10(b), partition walls 17 are formed on the first substrate 1a. Here, the planar shape of the partition walls 17 is such that the two types of liquid crystal compositions can be separated from each other within one pixel as shown in FIG. 11A. Furthermore, the shape of the partition walls 17 may be as shown in FIG. 11A to FIG. 11D; the partition walls 17 are coupled together to form a liquid crystal accommodation portion (partition wall coupling portions 21a and 21b) such that liquid crystal compositions of the same type in the respective different pixels are in communication with each other outside the pixels. The response speed of the liquid crystal depends on a cell gap. Thus, the height of the partition walls 17 is preferably several μm to several tens of μm. The partition walls 17 can be formed using, for example, a photolithography technique. First, a resist of a photosensitive material is coated on the substrate and prebaked. The resist is exposed through a mask with a pattern for the shape of the partition walls 17. The mask pattern is thus transferred to the resist. The resist may be of a negative type or a positive type. Then, the exposed resist is developed and cleaned in a rinse agent. The cleaned resist is then postbaked. In this manner, the partition walls 17 are formed.

Then, as shown in FIG. 10(c), the adhesive 18 is coated on a support plate 19. The adhesive 18 is pressed and thus coated on a top portion 20 of each of the partition walls 17. The adhesive 18 is preferably an ultraviolet curable epoxy resin or a thermosetting epoxy resin. After the step shown in FIG. 10(b), treatment may be carried out so as to make the contact between the adhesive 18 and the partition walls 17 tighter. Alternatively, in order to improve the control of the cell gap, a spacer material of spherical particles may be dispersed after the formation of the partition walls 17.

To bring the first substrate 1a and the second substrate 1b into tight contact at the periphery of the substrates, a sealing agent is coated with a dispenser on one of the substrates at the periphery thereof and then prebaked. In order to improve the control of the cell gap, the sealing agent may be mixed with the spacer material.

Then, as shown in FIG. 1(d), the first substrate 1a with the partition walls 17 and the adhesive 18 formed thereon is laid on and tightly contacted with the second substrate 1b. Then, the adhesive 18 and the sealing agent provided at the periphery of the substrate are cured by ultraviolet radiation or by heat.

Figure 13A:
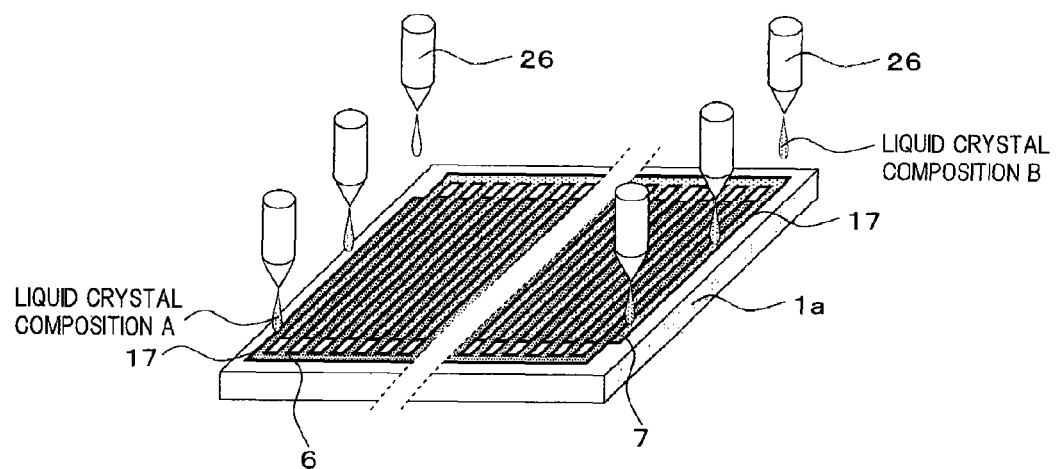
FIGS. 13A and 13B are perspective views showing methods for injecting the liquid crystal compositions of the liquid crystal display element according to the first exemplary embodiment of the invention.
Figure 13B:
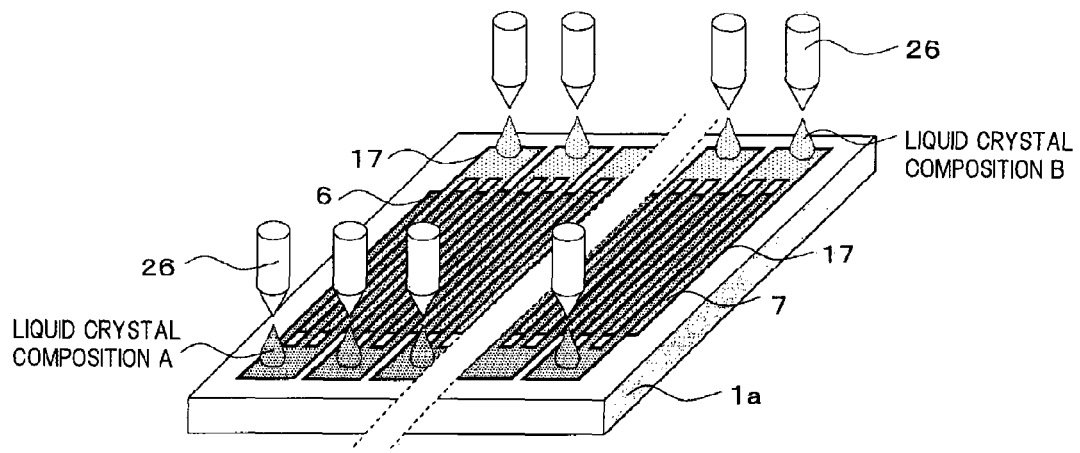

FIGS. 12A and 12B are sectional views showing a method for injecting the liquid crystal compositions of the liquid crystal display element according to the present exemplary embodiment. FIGS. 13A and 13B are perspective views showing another method for injecting the liquid crystal compositions of the liquid crystal display element according to the present exemplary embodiment.

As shown in FIG. 12A, openings 22 are formed for the partition walls 17. In a vacuum chamber 24, the liquid crystal composition A in a container 23 is injected through the openings 22 by a vacuum injection method. Then, an ultraviolet curable resin 25 is coated on and around the openings 22 and cured by ultraviolet radiation to seal the openings 22. Then, as shown in FIG. 12B, the liquid crystal composition B is similarly injected and sealed. As a result, the two types of liquid crystal compositions can be injected without being mixed together.

Alternatively, after the step shown in FIG. 10C or the step shown in FIG. 10B, a dripping device 26 may be used to drip a liquid crystal in the air as shown in FIGS. 13A and 13B. Thereafter, the step shown in FIG. 10D may be carried out in a vacuum. Alternatively, after the step shown in FIG. 10C, the adhesive 18 may be temporarily cured, and after the dripping of the liquid crystals, fully cured in the step shown in FIG. 10D. Here, by dripping the liquid crystal onto the partition wall coupling portions 21a and 21b as shown in FIG. 13B, it is possible to increase the amount of dripped liquid crystals by the dripping method shown in FIG. 13A.

In the above-described present exemplary embodiment, if the usage environment temperature T0 is between the temperature T2 and the temperature T4, when a voltage is applied to the transparent electrodes 2a and 2b in the element structure shown in FIG. 8 or to the transparent electrodes 2a, 2b, 2a', and 2b' in the element structure shown in FIG. 9, the liquid crystal composition B, which is in the liquid crystal phase, is driven. Between the temperature T2 and the temperature T4, the liquid crystal composition A exhibits crystal phase and is not driven even with the applied voltage. Furthermore, if the usage environment temperature T0 is between the temperature T4 and the temperature T5, when a voltage is similarly applied, the liquid crystal composition A, which is in the liquid crystal phase, is driven. Between the temperature T4 and the temperature T5, the liquid crystal composition B exhibits the isotropic crystal phase and is not driven even with the applied voltage. Thus, the liquid crystal-containing layer 5 is composed of the two types of liquid crystal compositions A and B with the different temperature ranges within which the respective liquid crystal compositions exhibit liquid crystal phase. Each of the two types of liquid crystal compositions A and B is closed and isolated. Thus, the liquid crystal display element 3 can be obtained which can be driven between the temperature T2 and the temperature T5, the liquid crystal display element can perform display over a wider temperature range than conventional liquid crystal display elements.

In the above-described embodiment, the liquid crystal phase and the isotropic liquid phase may be mixed in a pixel.

Thus, in order to suppress a decrease in contrast ratio, a polarizer is desirably located in a crossed Nichol state.

Furthermore, the liquid crystal composition group 9 is provided within a very small range, that is, within one pixel. Thus, pixel portions operating within the different temperature ranges can be reliably provided.

The above-described present exemplary embodiment enables the same resolution to be maintained over a wide temperature range.

In the present exemplary embodiment, the electrodes are provided on both sides of the paired substrates by way of example. However, the electrodes may comply with a traversal field mode or any other driving scheme. Furthermore, obviously, a thin film diode (TFD) with a 2-terminal element or a thin film transistor (TFT) with a 3-terminal element may be used. The TFT may be an amorphous silicon TFT (a-Si TFT), a polycrystalline silicon TFT (high-temperature poly-Si TFT or low-temperature poly-Si TFT), an oxide TFT, an organic TFT, or the like. Moreover, substrates of a plastic material may be used.

Furthermore, the temperature ranges within which the respective liquid crystal compositions exhibit liquid crystal phase are illustrative. The present invention is not limited to theses temperature ranges.

Second Exemplary Embodiment

Now, a second exemplary embodiment of the invention will be described with reference to FIG. 14 and FIG. 15. The present exemplary embodiment is different from the first exemplary embodiment in the liquid crystal-containing layer structure in the liquid crystal display element.

Figure 14:
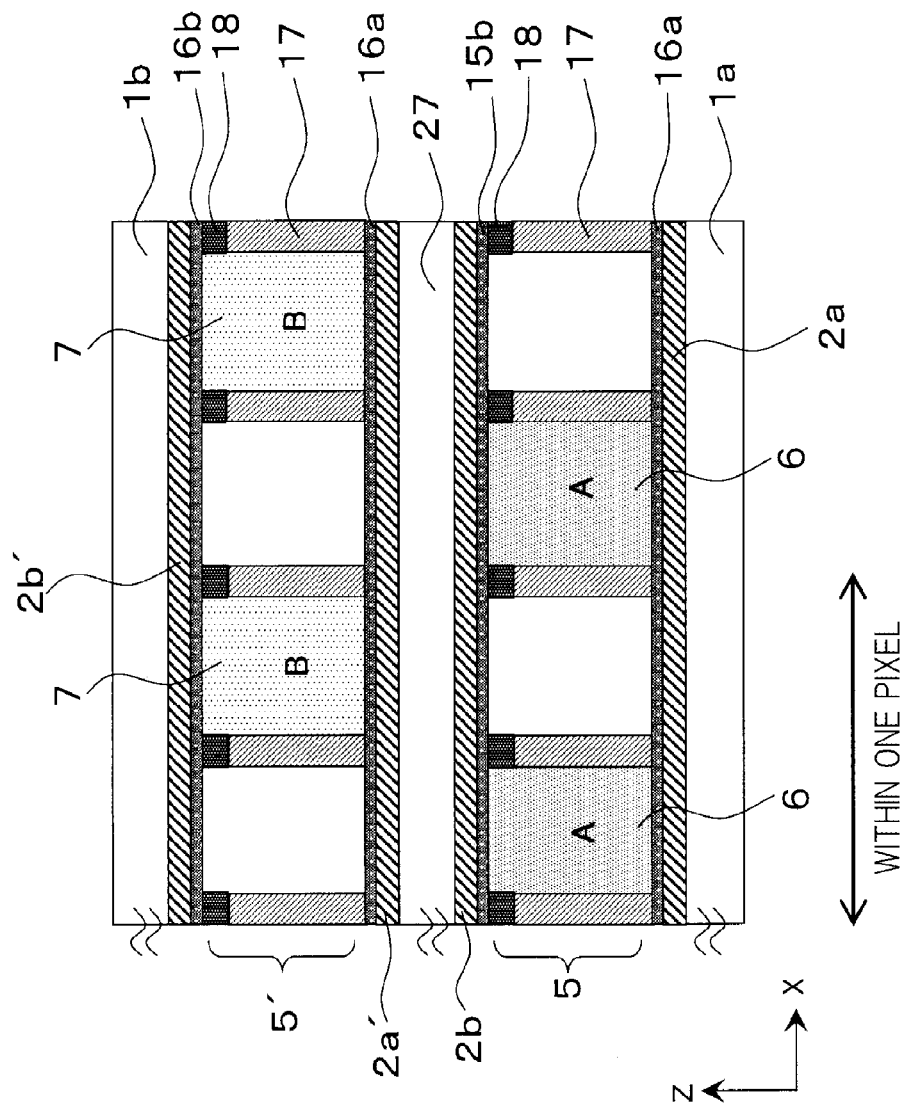
FIG. 14 is a sectional view showing a liquid crystal-containing layer structure in a liquid crystal display element according to a second exemplary embodiment of the invention.
Figure 15:
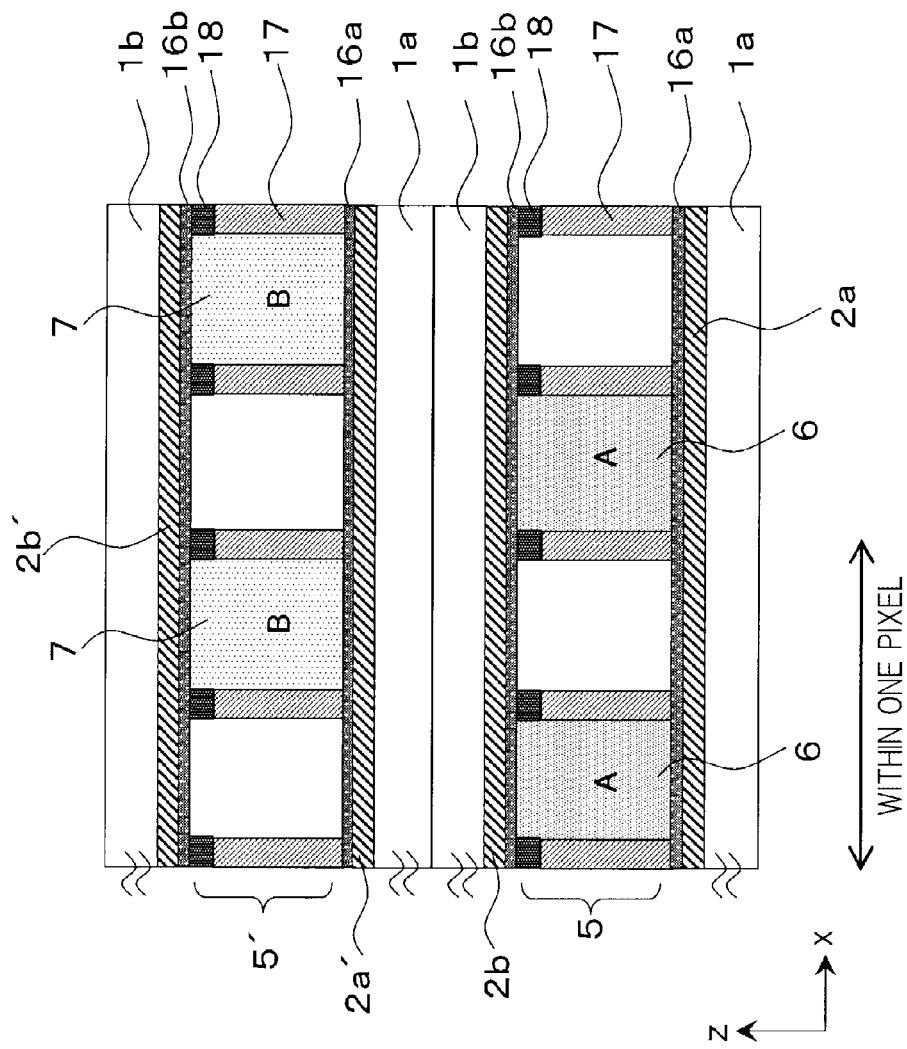
FIG. 15 is a sectional view showing a liquid crystal-containing layer structure in a liquid crystal display element according to the second exemplary embodiment of the invention.

FIG. 14 and FIG. 15 are sectional views showing the liquid crystal-containing layer structures in the liquid crystal display elements according to the present exemplary embodiment. As shown in FIG. 14 and FIG. 15, in the present exemplary embodiment, two types of liquid crystal-containing layers 5 and 5' are stacked in the direction of a Z axis (which is perpendicular to the substrate plane). The liquid crystal-containing layer 5 is composed of the areas 6 of a liquid crystal composition A. The areas 6 are arranged at equal intervals in the direction of the X axis (the planar direction of the substrate) via spaces in which no liquid crystal composition is injected. The liquid crystal-containing layer 5' is composed of the areas 7 of a liquid crystal composition B. The areas 7 are arranged at equal intervals in the direction of the X axis via spaces in which no liquid crystal composition is injected. When the liquid crystal-containing layers 5 and 5' are stacked, each of the areas 6 overlaps none of the areas 7 in the direction of the Z axis. Thus, the liquid crystal-containing layers 5 and 5' are arranged so as not to affect each other. As a result, light passing through the liquid crystal composition A does not pass through the liquid crystal composition B. Light passing through the liquid crystal composition B does not pass through the liquid crystal composition A.

The liquid crystal-containing layers 5 and 5' may be stacked via a common substrate 27 as shown in FIG. 14 or stacked by coupling a second substrate 1b on the liquid crystal-containing layer 5 side with a first substrate 1a on the liquid crystal-containing layer 5' side as shown in FIG. 15.

The above-described present exemplary embodiment can exert effects similar to those of the first exemplary embodiment.

The arrangements and operations of the present exemplary embodiment other than those described above are similar to the corresponding arrangements and operations of the above-described first exemplary embodiment.

Third Exemplary Embodiment

Now, a third exemplary embodiment of the invention will be described with reference to FIGS. 16A and 16B. The present exemplary embodiment is different from the first exemplary embodiment in the liquid crystal-containing layer structure in the liquid crystal display element.

Figure 16A:
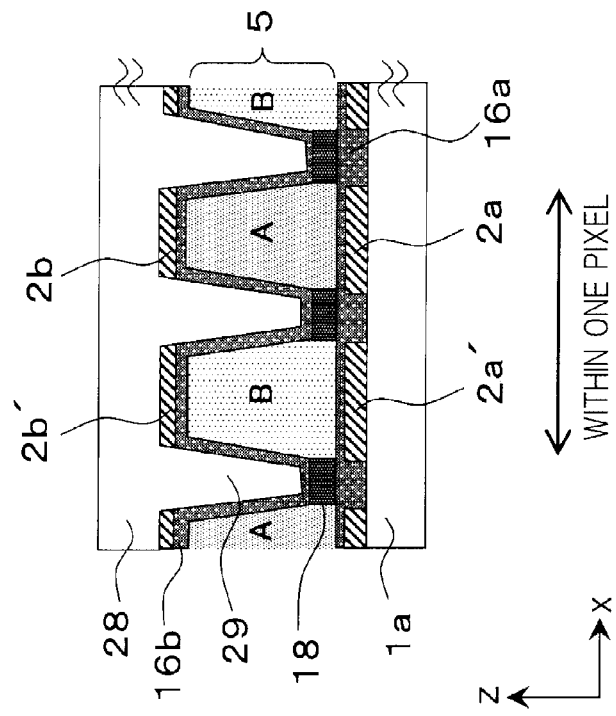
FIGS. 16A and 16B are sectional views showing liquid crystal-containing layer structures in liquid crystal display elements according to a third exemplary embodiment of the invention.
Figure 16B:
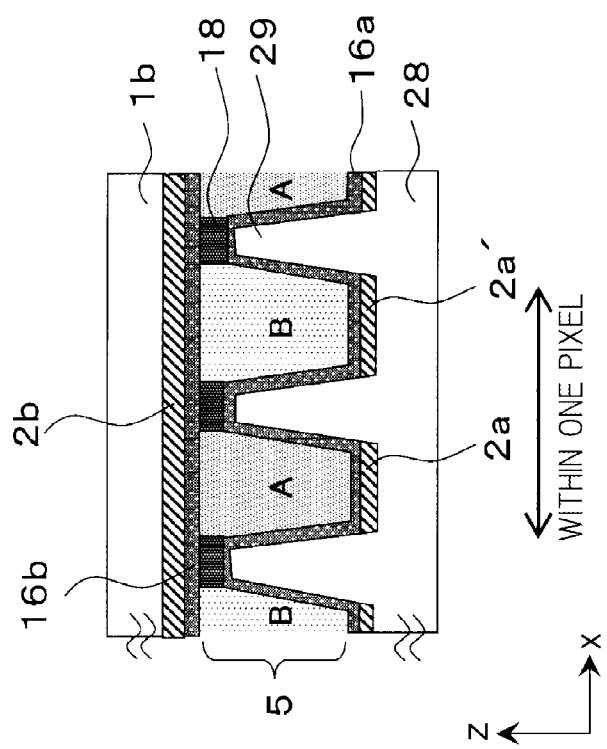

FIGS. 16A and 16B are sectional views showing the liquid crystal-containing layer structures in the liquid crystal display elements according to the present exemplary embodiment. As shown in FIGS. 16A and 16B, in the present exemplary embodiment, the portions corresponding to the partition walls 17 in the first exemplary embodiment (FIG. 8 and FIG. 9) are formed by partition wall portions 29 integrated with a plastic substrate.

In the structure shown in FIG. 16A, a plastic substrate 28 integrated with the partition wall portions 29 is used instead of the first substrate 1a according to the first exemplary embodiment. Transparent electrodes 2a and 2a' are each separately arranged on the substrate 28 between the partition wall portions 29. An orientation film 16a is formed on the transparent electrodes 2a and 2a'. The adhesive 18 is coated on the tip portion (top) of each of the partition wall portions 29. The plastic substrate 28 is laminated to a second substrate 1b with a transparent electrode 2b and an orientation film 16b provided thereon.

In the structure shown in FIG. 16B, the plastic substrate 28 integrated with the partition wall portions 29 is used instead of the second substrate 1b according to the first exemplary embodiment. Transparent electrodes 2b and 2b' are each separately arranged on the substrate 28 between the partition wall portions 29. An orientation film 16b is formed on the transparent electrodes 2b and 2b'. The adhesive 18 is coated on the tip portion (top) of each of the partition wall portions 29. The plastic substrate 28 is laminated to the first substrate 1a with the transparent electrodes 2a and 2a' and the orientation film 16a provided thereon. The transparent electrodes 2b and 2b' on the plastic substrate 28 are located opposite the transparent electrodes 2a and 2a' on the first substrate 1a via liquid crystal compositions.

Now, a description will be given of a method for manufacturing the liquid crystal-containing layer structure in the liquid crystal display element according to the present exemplary embodiment configured as described above.

Figure 17:
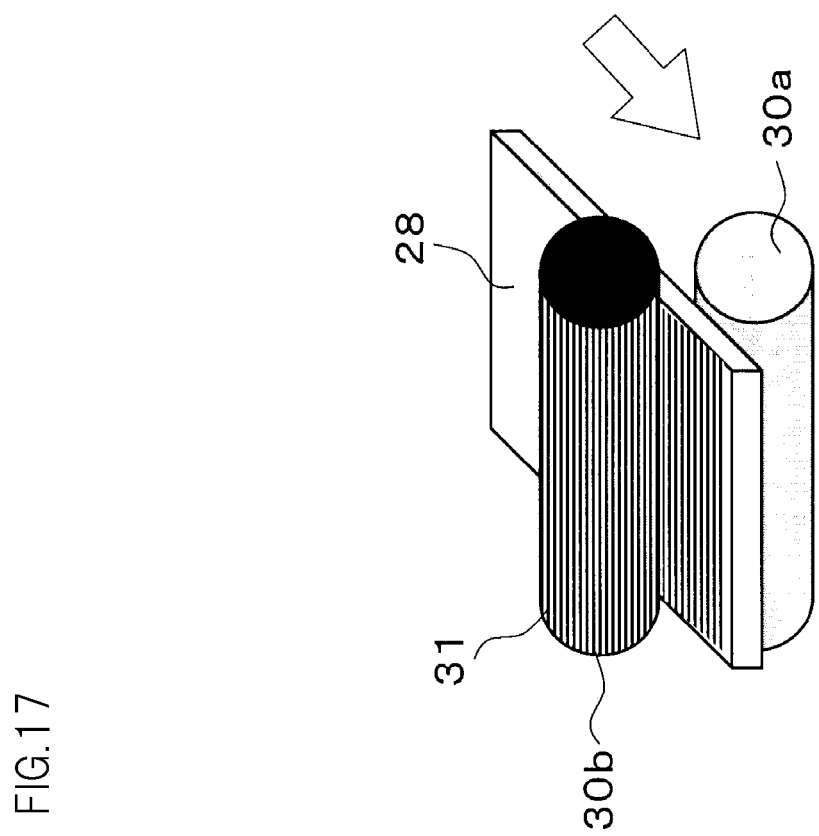
FIG. 17 is a perspective view illustrating a method for forming a substrate used for the liquid crystal-containing layer structures in the liquid crystal display elements according to the third exemplary embodiment of the invention.

FIG. 17 is a perspective view illustrating a method for forming the substrate in the liquid crystal structure in the liquid crystal display element according to the present embodiment. FIG. 18A to FIG. 18D are sectional views sequentially showing steps of another method for forming the substrate in the liquid crystal-containing layer structure in the liquid crystal display element according to the present exemplary embodiment. As shown in FIG. 17, a pattern 31 of the partition wall shape is engraved in a roll 30b which is one of paired rolls 30a and 30b. The deformable plastic substrate is passed between the paired rolls 30a and 30b so as to be pressed. As a result, the plastic substrate 28 molded integrally with the partition wall portions 29 is formed.

Figure 18:
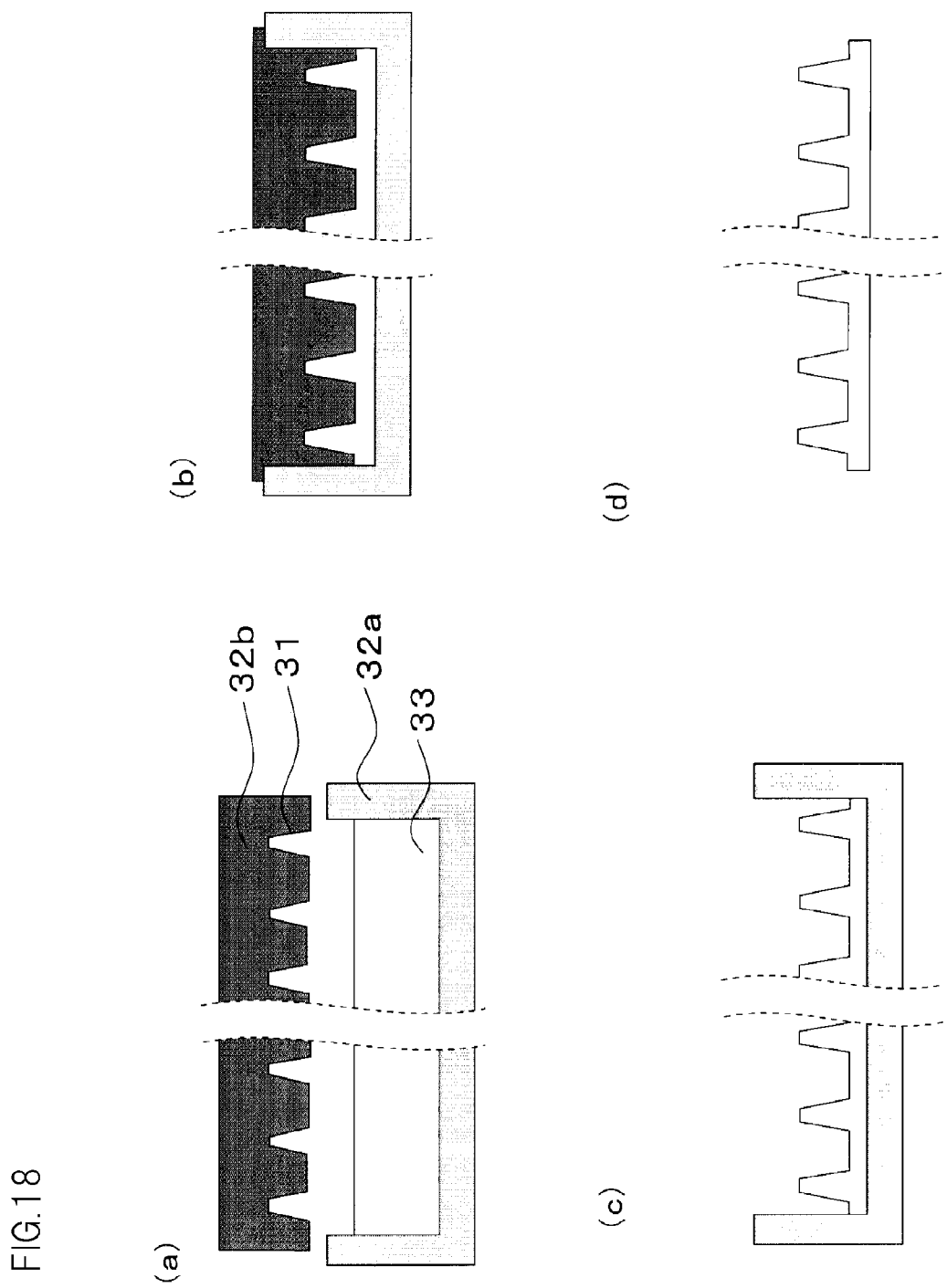
FIG. 18 is a sectional view sequentially showing steps of another method for forming the substrate in the liquid crystal-containing layer structures in the liquid crystal display elements according to the third exemplary embodiment of the invention.

The plastic substrate 28 can also be formed by injection molding as shown in FIG. 18A to FIG. 18D. First, as shown in FIG. 18A, a mold 32b having the pattern 31 of the partition wall shape, a hot plastic melt 33, and a mold 32a containing the plastic melt 33 are prepared. Then, as shown in FIG. 18B, the mold 32b is pressed against the mold 32a with the plastic melt 33 contained therein. The molds 32b and 32a are cooled for a given time to solidify the plastic. The mold 32b is removed (FIG. 18C), and then the mold 32a is removed. Thus, the plastic substrate 28 is formed (FIG. 18D).

The above-described present exemplary embodiment can exert effects similar to those of the first exemplary embodiment.

Furthermore, since the partition walls are integrated with the plastic substrate, the partition wall forming process including the photolithography step is shortened. This enables productivity to be improved.

Furthermore, the use of the plastic substrate enables the liquid crystal display element to be made flexible.

The arrangements and operations of the present exemplary embodiment other than those described above are similar to the corresponding arrangements and operations of the above-described first exemplary embodiment.

In the present exemplary embodiment, one of the paired substrates with the electrodes formed thereon is made of plastic. However, both of the paired substrates may be made of plastic or may include the partition wall portions 29.

Fourth Exemplary Embodiment

Now, a fourth exemplary embodiment of the invention will be described with reference to FIG. 19. The present exemplary embodiment is different from the first exemplary embodiment in the liquid crystal-containing layer structure in the liquid crystal display element.

Figure 19:
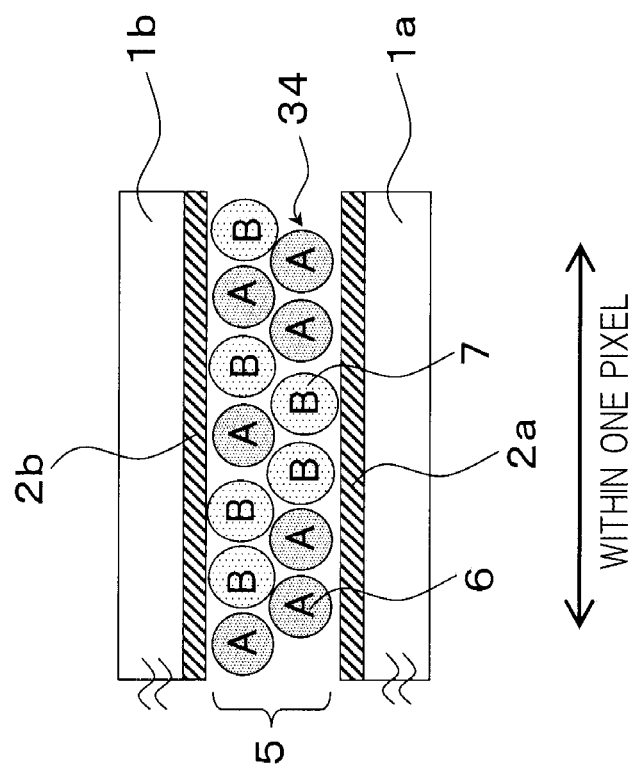
FIG. 19 is a sectional view showing a liquid crystal-containing layer structure in a liquid crystal display element according to a fourth exemplary embodiment of the invention.

FIG. 19 is a sectional view showing the liquid crystal-containing layer structure in the liquid crystal display element according to the present exemplary embodiment. As shown in FIG. 19, two types of liquid crystal compositions A and B in the liquid crystal-containing layer 5 are each sealed and isolated by a microencapsulation technique. Microcapsules 34 (areas 6) of the liquid crystal composition A and microcapsules (areas 7) of the liquid crystal composition B are evenly dispersed in the liquid crystal-containing layer.

Now, a description will be given of a method for manufacturing the liquid crystal-containing layer structure in the liquid crystal display element according to the present exemplary embodiment configured as described above.

Figure 20:
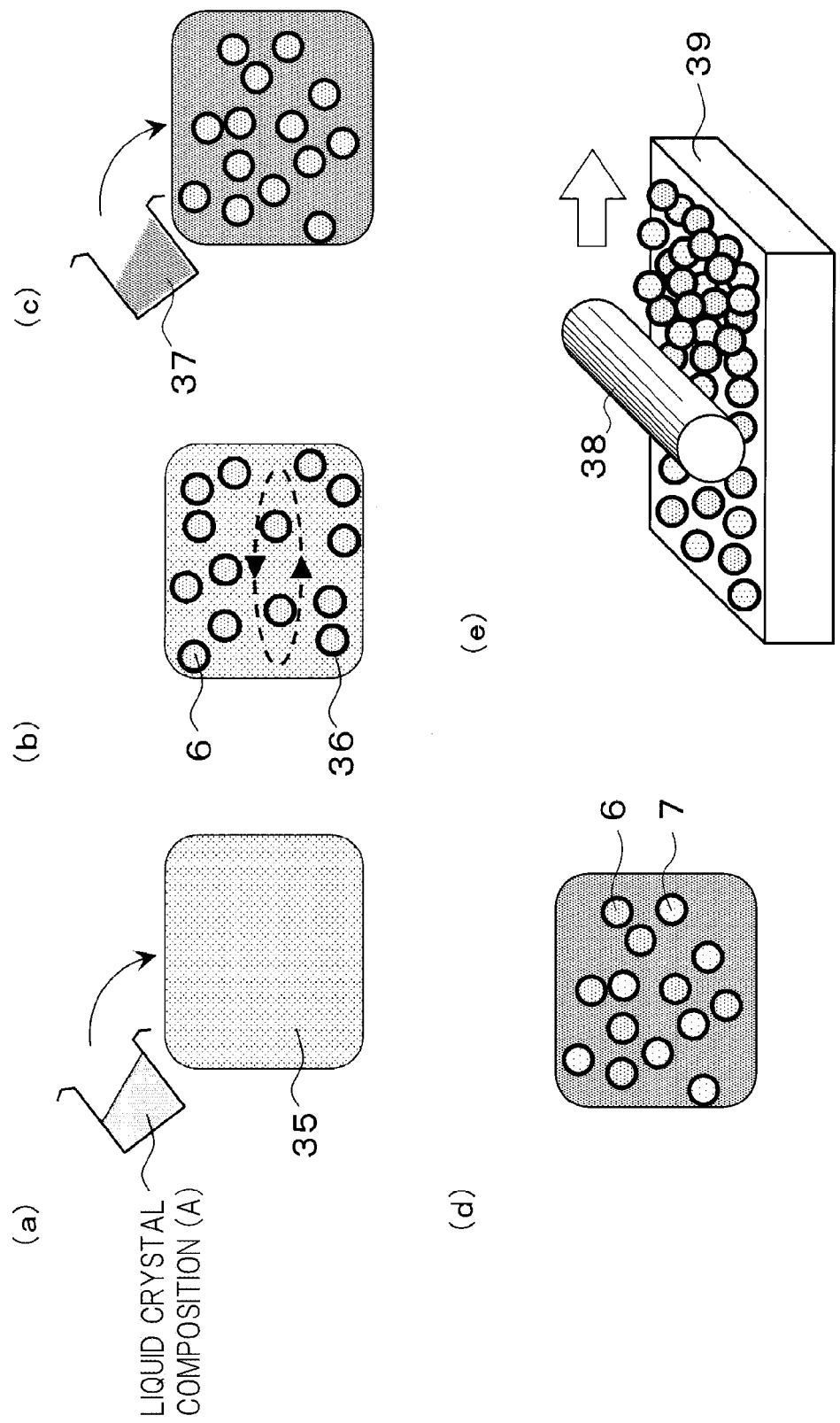
FIG. 20 is a schematic diagram sequentially showing steps of a method for manufacturing the liquid crystal-containing layer structure in the liquid crystal display element according to the fourth exemplary embodiment of the invention.

FIGS. 20(a) to (e) are schematic diagrams sequentially showing steps of a method for manufacturing the liquid crystal structure in the liquid crystal display element according to the present exemplary embodiment. First, as shown in FIG. 20(a), a disperse phase composed of the liquid crystal composition A is dispersed in an emulsified dispersed liquid 35 with emulsion stability. An emulsifying step is carried out by, for example, a method of dispersing the dispersion phase composed of the liquid crystal composition A, into very small droplets by the mechanical shear force of a homogenizer or the like or a method of extruding the disperse phase through a porous membrane to disperse the disperse phase into very small droplets. Then, as shown in FIG. 20(b), the emulsified dispersed liquid 35 is stirred to allow a capsule membrane 36 to be formed. The step of forming the capsule membrane 36 is carried out by, for example, a method of allowing a droplet interface to adsorb membrane substances produced in the emulsified dispersed liquid 35, a method in which substances added to the disperse phase and the emulsified dispersed liquid 35, respectively, react at the interface to generate a membrane, or a method in which membrane substances generated in the disperse phase aggregate at the interface of the emulsified dispersed liquid 35 to form a membrane. Then, as shown in FIG. 20(c), to stabilize the capsule membrane 36, a stabilizer 37 such as a curing agent or a reactant is added to the liquid to microencapsulate the liquid crystal composition A, thus forming the area 6 of the liquid crystal composition A. For the liquid crystal composition B, the steps shown in FIGS. 20(a) to 20(c) are similarly carried out to form the area 7 of the microencapsulated liquid crystal composition B. Then, as shown in FIG. 20(d), the microencapsulated liquid crystal composition A (area 6) is mixed with the microencapsulated liquid crystal composition B (area 7). Then, as shown in FIG. 20(e), the mixture is coated on a substrate 39 using, for example, a coater 38. Thus, the two types of liquid crystal compositions A and B each sealed and isolated by the microencapsulation are evenly dispersed in the liquid crystal-containing layer 5.

The above-described present exemplary embodiment can exert effects similar to those of the first exemplary embodiment.

Furthermore, the microencapsulation of each liquid crystal composition eliminates the need for the partition wall forming process including the photolithography step. The microencapsulation technique facilitates sealing and isolation of at least two types of liquid crystal compositions. Thus, the process for manufacturing the liquid crystal display element can be simplified.

The arrangements and operations of the present exemplary embodiment other than those described above are similar to the corresponding arrangements and operations of the above-described first exemplary embodiment.

Fifth Exemplary Embodiment

Now, a fifth exemplary embodiment of the invention will be described with reference to FIGS. 2A and 2B. The present exemplary embodiment is different from the first exemplary embodiment to fourth exemplary embodiment in the temperature ranges in which the liquid crystal compositions exhibit liquid crystal phase.

FIGS. 2A and 2B are phase diagrams of liquid crystal compositions used in a liquid crystal display element according to the present exemplary embodiment. As shown in FIG. 2B, both liquid crystal compositions A and B exhibit liquid crystal phase between the temperature T3 and the temperature T4. If the usage environment temperature T0 is between the temperature T3 and the temperature T4, application of a voltage to transparent electrodes allows the liquid crystal compositions A and B to exhibit liquid crystal phase. Thus, both the liquid crystal compositions A and B are driven. Compared to the case in which the liquid crystal compositions A and B do not exhibit liquid crystal phase simultaneously, and the only liquid crystal composition B exhibits liquid crystal phase and is driven between the temperature T3 and the temperature T4 as shown in FIG. 2A, the present exemplary embodiment shown in FIG. 2B allows many liquid crystal compositions to be driven in a liquid crystal-containing layer 5. Examples of liquid crystal compositions with characteristics shown in FIG. 2B are as follows. The liquid crystal composition A may be 4-methoxy-4'-butanoyloxy-diphenylacetylene (liquid crystal phase temperature range: 84° C. to 110° C.). The liquid crystal composition B may be 4-n-hexyl-4'-n-butoxyazoxybenzene (liquid crystal phase temperature range: 27° C. to 90.5° C.).

The above-described liquid crystal compositions A and B can be used in, for example, the liquid crystal display elements shown in FIG. 8, FIG. 9, FIG. 14 to FIG. 16, and FIG. 19.

The above-described present exemplary embodiment can exert effects similar to those of the first exemplary embodiment, and at the usage environment temperature at which a plurality of liquid crystal compositions simultaneously exhibit liquid crystal phase, allows more liquid crystal compositions to be driven. Hence, the displayable pixel area is increased, allowing the display luminance to be improved.

The arrangements and operations of the present exemplary embodiment other than those described above are similar to the corresponding arrangements and operations of the above-described first to fourth exemplary embodiments.

Sixth Exemplary Embodiment

Now, a sixth exemplary embodiment of the invention will be described with reference to FIGS. 2B and FIG. 21. The present exemplary embodiment is an example of a liquid crystal display device including any one of the liquid crystal display elements according to the first exemplary embodiment to fifth exemplary embodiment and a particular correction layer.

Figure 21:
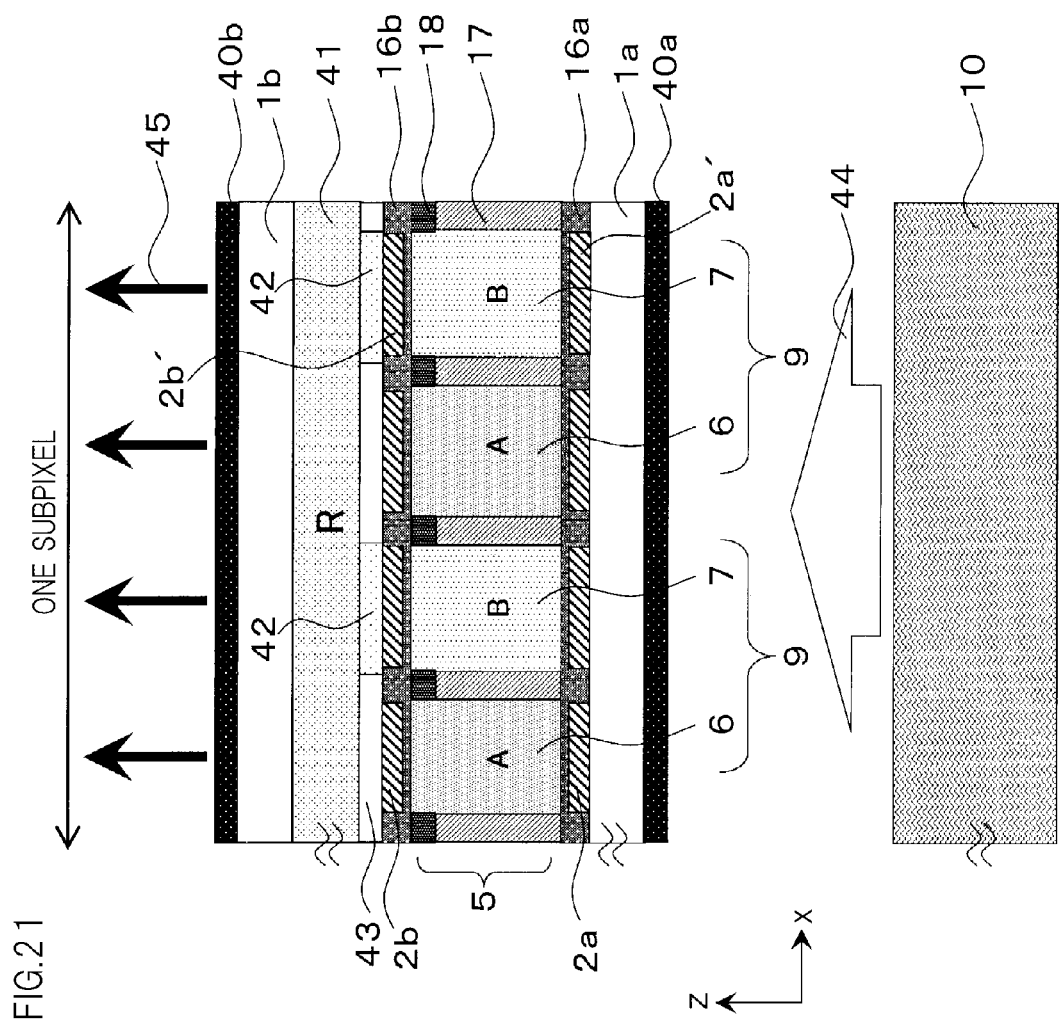
FIG. 21 is a sectional view showing a part of a liquid crystal display device according to a sixth exemplary embodiment of the invention.

FIG. 21 is a sectional view showing a part of the liquid crystal display device according to the present exemplary embodiment. As shown in FIG. 21, the liquid crystal display device according to the present exemplary embodiment includes the liquid crystal display element, a backlight 10 used in an ordinary liquid crystal display device, polarizers 40a and 40b, a color filter 41 provided on the second substrate 1b, and a correction layer 43 with a correction area 42.

The color filter 41 is provided for full color display and composed of three colors including R (Red), G (Green), and B (Blue). The colors are arranged in the direction of the X axis in order of R, G, B, R, G, B, . . . . Each of R, G, and B is called a subpixel. A set of R, G, and B is called one pixel. FIG. 21 shows a structural portion in which two liquid crystal composition groups 9 are contained in one R subpixel.

FIG. 2B is a phase diagram showing liquid crystal compositions A and B used in the liquid crystal display device according to the present exemplary embodiment. When the usage environment temperature T0 is between the temperature T3 and the temperature T4, a voltage is applied to transparent electrodes to allow a backlight beam 44 from the backlight 10 to enter the liquid crystal-containing layer 5. The liquid crystal compositions A and B contained in the liquid crystal-containing layer 5 have different temperature ranges within which the liquid crystal compositions A and B exhibit liquid crystal phase, and different temperature-dependent refractive index anisotropy $\Delta n$ values. Thus, a phase difference of retardation (the product ($\Delta nd$) of the refractive index anisotropy ($\Delta n$) in the liquid crystal composition and a cell gap (d)) may occur in the liquid crystal-containing layer 5 unless the liquid crystal material is comprehensively designed taking into account the dependence of various physical property values on temperature. In this state, if light having entered the liquid crystal-containing layer 5 is transmitted directly through the color filter 41 and the polarizer 40b, the color tone of display light 45 is disturbed. Thus, to make the retardation value of the liquid crystal composition B equal to that of the liquid crystal composition A, the correction layer 43 with the correction area 42 having a function to correct the phase difference is provided between the color filter 41 and the transparent electrode. The correction area 42 can be formed of, for example, a film obtained by curing a birefringent liquid-crystalline monomer. Thus, light transmitted through the liquid crystal composition B is corrected by the correction area 42 so that the retardation value of the liquid crystal composition B is equal to that of the liquid crystal composition A. As a result, the phase difference of retardation in the liquid crystal-containing layer 5 is avoided. The display light 45 transmitted through the color filter 41 and the polarizer 40b can have a favorable color tone.

The above-described present exemplary embodiment can exert effects similar to those of the aforementioned exemplary embodiments applied to the present exemplary embodiment. Furthermore, the present exemplary embodiment provides the display light 45 with a favorable color tone owing to the correction layer 43 with the correction area 42 configured to correct the phase difference of retardation in the liquid crystal-containing layer 5.

The arrangements and operations of the present exemplary embodiment other than those described above are similar to the corresponding arrangements and operations of the above-described first to fifth exemplary embodiments.

Seventh Exemplary Embodiment

Now, a seventh exemplary embodiment of the invention will be described with reference to FIGS. 2B and FIG. 22. The present exemplary embodiment is an example of a liquid crystal display device including any one of the liquid crystal display elements according to the above-described first to fifth exemplary embodiments and a particular color filter.

Figure 22:
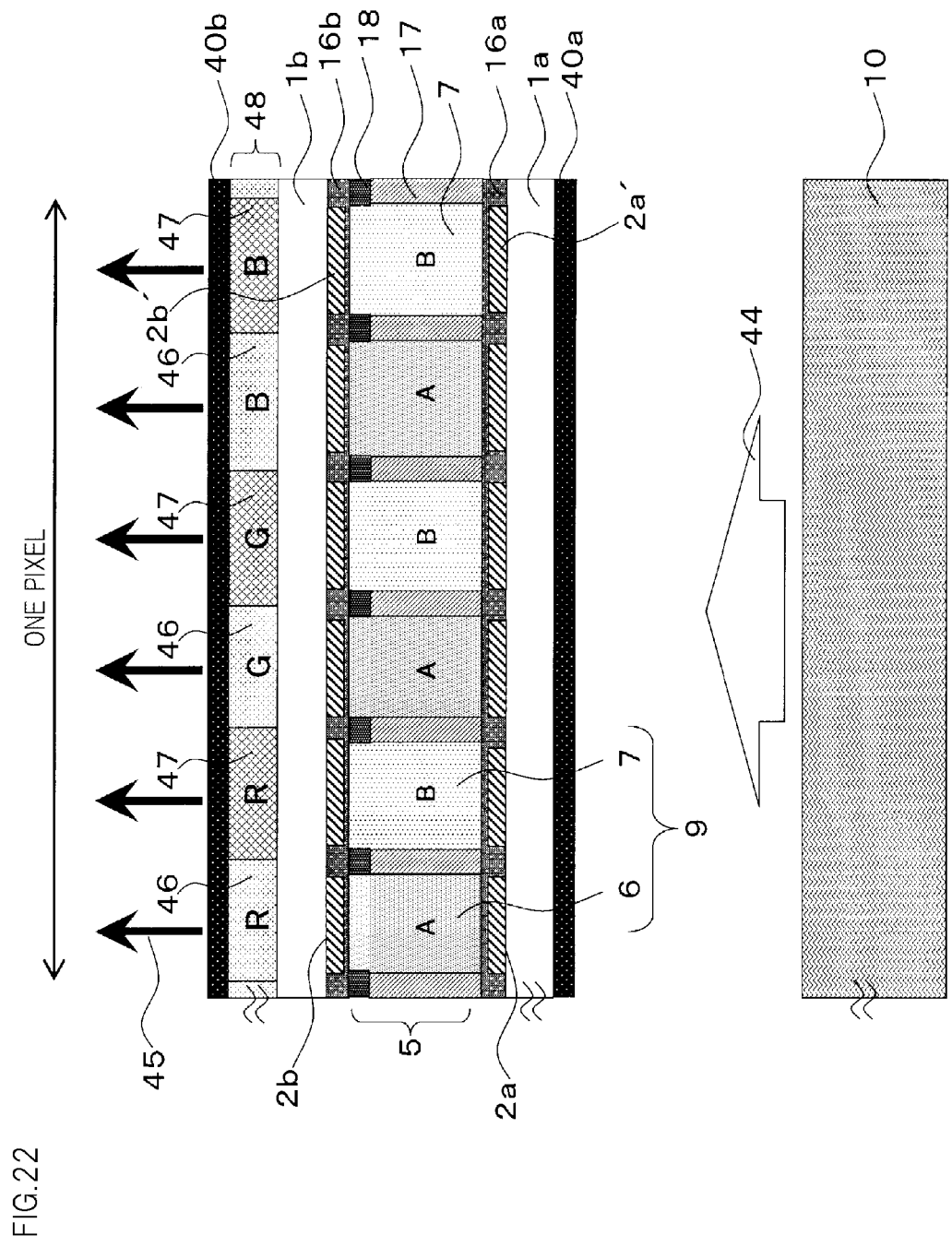
FIG. 22 is a sectional view showing a part of a liquid crystal display device according to a seventh exemplary embodiment of the invention.

FIG. 22 is a sectional view showing a part of the liquid crystal display device according to the present embodiment. As shown in FIG. 22, the liquid crystal display device according to the present embodiment includes the liquid crystal display element (the liquid crystal-containing layer 5 includes three liquid crystal composition groups 9 within one pixel), a backlight 10, polarizers 40a and 40b, and a color filter layer 48 provided on the second substrate 1b.

The color filter layer 48 includes a color filter I (46) and a color filter II (47) for each pixel (RGB).

FIG. 2B is a phase diagram of liquid crystal compositions A and B used in the liquid crystal display device according to the present exemplary embodiment. When the usage environment temperature T0 is between the temperature T3 and the temperature T4, a voltage is applied to transparent electrodes to allow a backlight beam 44 from the backlight 10 to enter the liquid crystal-containing layer 5. At this time, a phase difference of retardation may occur in the liquid crystal-containing layer 5 for the same reason as that described above in the sixth embodiment. Thus, as shown in FIG. 22, the color filter I (46) is placed on the area 6 of liquid crystal composition A. The color filter II (47) is placed on the area 7 of liquid crystal composition B. The color filters I and II thus have a function to correct phase differences. Hence, the retardation value of the liquid crystal composition B is made equal to that of the liquid crystal composition A via the color filters I and II. As a result, the phase difference of retardation in the liquid crystal-containing layer 5 is avoided. Display light 45 transmitted through the polarizer 40b can have a favorable color tone.

A method for forming the color filter layer 48 with the above-described function involves, for example, using a spin coater or the like to coat a material serving as phase difference layers on the color filter I formed by a normal technique. An example of a material for the phase difference layer is an organic solution containing polymerizable liquid crystal compound. The film thickness and the material are designed such that after film formation is completed, the phase difference has a predetermined value. After the coating, to remove the organic solvent, the layer is prebaked and then irradiated with ultraviolet rays and thus cured. A phase difference layer is similarly formed on the color filter II. In this manner, the color filter layer 48 with the phase difference layers can be formed.

The above-described present exemplary embodiment can exert effects similar to those of aforementioned exemplary embodiments applied to the present exemplary embodiment.

Furthermore, the present exemplary embodiment provides the display light 45 with a favorable color tone owing to the color filter layer 48 with the function to correct phase differences.

The arrangements and operations of the present exemplary embodiment other than those described above are similar to the corresponding arrangements and operations of the above-described first to fifth exemplary embodiments.

Eighth Exemplary Embodiment

Now, an eighth exemplary embodiment of the invention will be described with reference to FIG. 23 to FIG. 25. The present exemplary embodiment is a method for driving a liquid crystal display device with the liquid crystal display element according to any one of the above-described exemplary embodiments.

Figure 23:
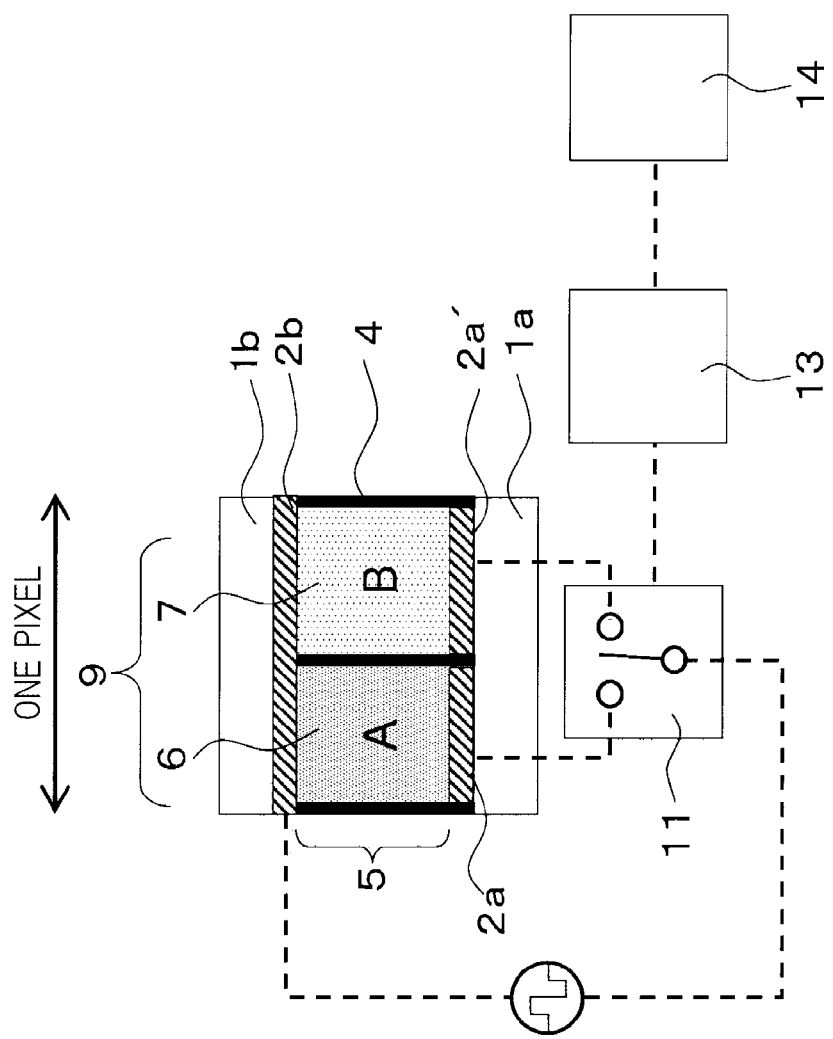
FIG. 23 is a schematic diagram illustrating a method for driving a liquid crystal display device according to an eighth exemplary embodiment of the invention.

FIG. 23 is a schematic diagram illustrating a method for driving the liquid crystal display device according to the present exemplary embodiment. The liquid crystal display device in the present exemplary embodiment includes the liquid crystal display element, a backlight 10, a liquid crystal drive circuit 11, and a light source drive circuit. An electrode selection circuit 13 is connected to the liquid crystal drive circuit 11. A temperature sensor 14 is connected to the electrode selection circuit 13. Furthermore, one of the transparent electrodes in the liquid crystal display element is separated into pieces in accordance with the types of liquid crystal compositions. Here, one liquid crystal composition group 9 (the area 6 of liquid crystal composition A and the area 7 of liquid crystal composition B) is provided within one pixel.

Figure 24:
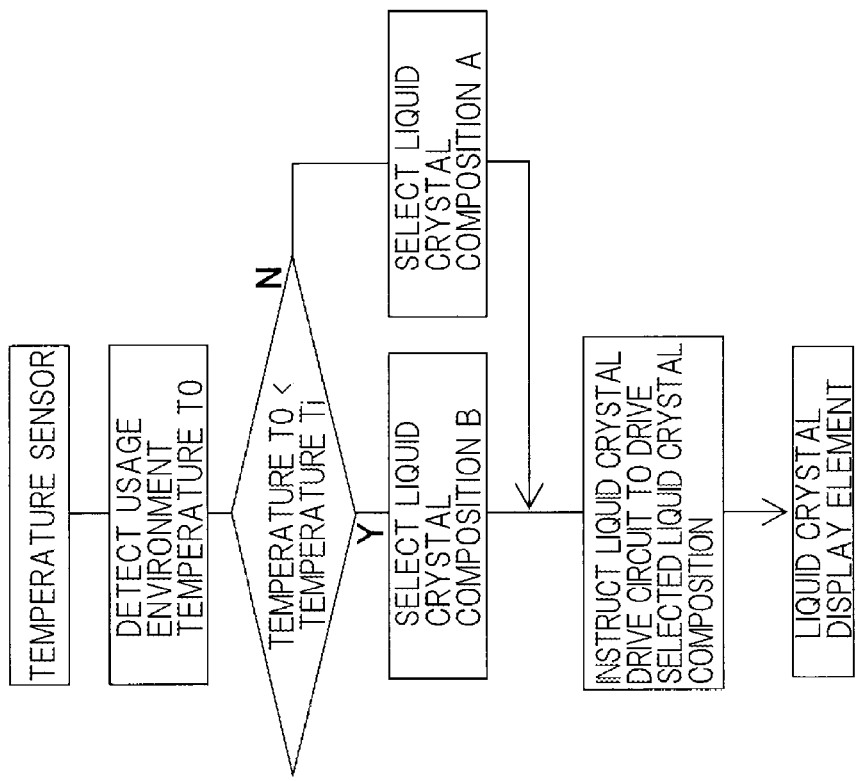
FIG. 24 is a flowchart illustrating processing executed by the liquid crystal display device according to the eighth exemplary embodiment of the invention.

FIG. 24 is a flowchart illustrating processing executed by the liquid crystal display device according to the present exemplary embodiment. As shown in FIG. 24, first, the temperature sensor 14 detects and outputs the usage environment temperature T0 to the electrode selection circuit 13. The electrode selection circuit 13 compares the usage environment temperature T0 with a liquid crystal phase temperature range (in this case, a temperature Ti) for the liquid crystal composition group 9 which is preset as a reference. If the usage environment temperature T0 is lower than the temperature Ti, the electrode selection circuit 13 selects the liquid crystal composition B (area 7). If the usage environment temperature T0 is higher than the temperature Ti, the electrode selection circuit 13 selects the liquid crystal composition A (area 6). Then, the electrode selection circuit 13 outputs a signal to the liquid crystal drive circuit 11 so as to drive only the selected liquid crystal composition. The liquid crystal drive circuit 11 drives the liquid crystal display element in accordance with the signal.

Figure 25:
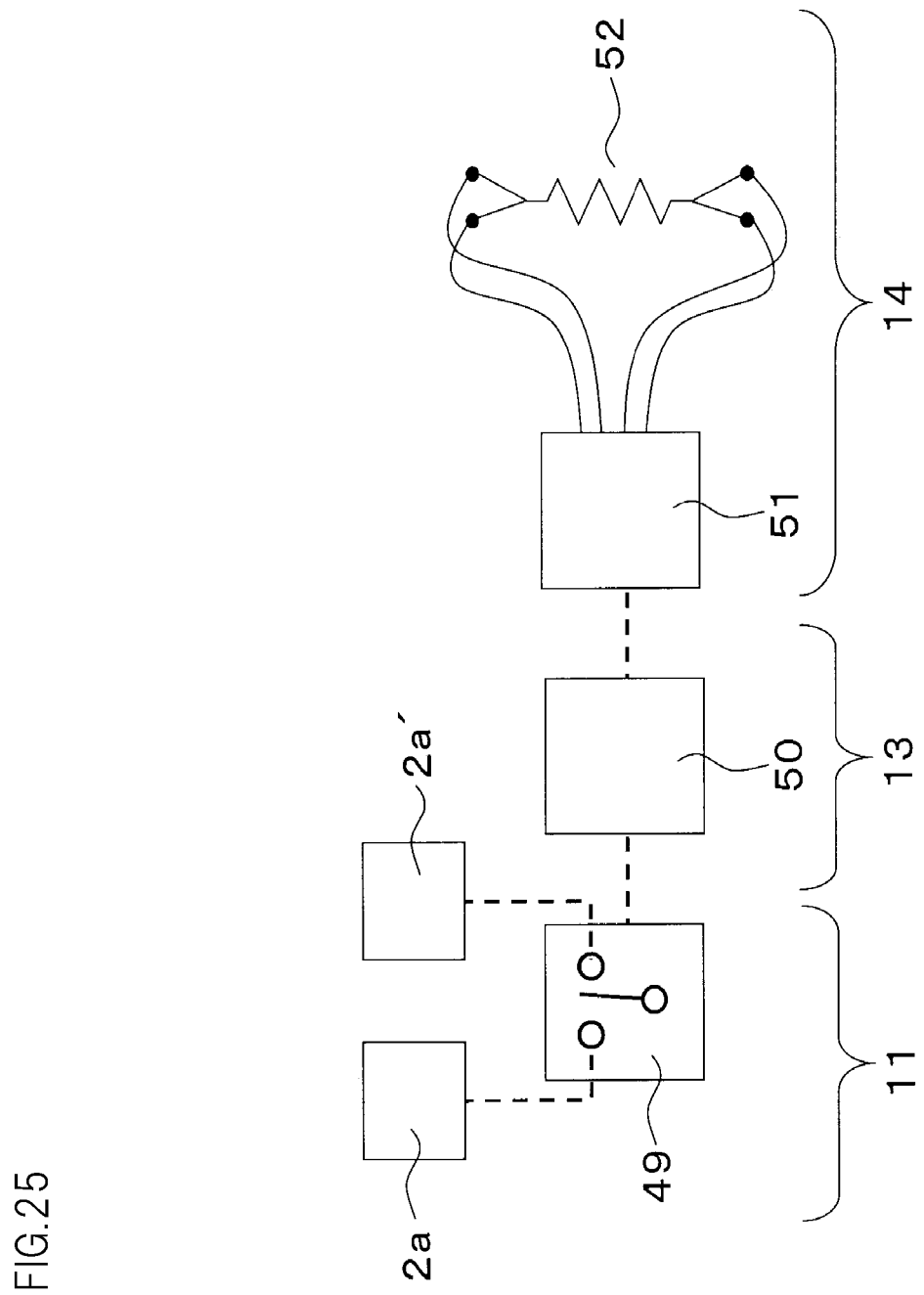
FIG. 25 is a schematic diagram illustrating the method for driving the liquid crystal display device according to the eighth exemplary embodiment of the invention.

FIG. 25 is a schematic diagram further illustrating the method for driving the liquid crystal display device according to the present exemplary embodiment. Specific examples of the temperature sensor 14 and the electrode selection circuit 13 will be described. For example, a platinum temperature measurement resistor 52 and a multimeter 51 may be used as the temperature sensor 14. A PC (Personal Computer) 50 may be used as the electrode selection circuit 13. A waveform generator 49 may be used as the liquid crystal drive circuit 11. The temperature measurement resistor utilizes temperature variation characteristics of a resistance value. As a sensor material for the temperature measurement resistor, platinum is often used, and in particular, Pt100 is normally used. Besides platinum, nickel, copper, or a thermistor is relatively frequently used. In the example shown in FIG. 25, four lead wires are led out from the platinum temperature measurement resistor 52 so that the multimeter 51 can read a resistance value. The PC (50) is connected to the multimeter 51 and the waveform generator 49 by GPIB cables or the like. The PC (50), controlled by programs, derives the usage environment temperature T0 from the resistance value of the platinum temperature measurement resistor 52 read by the multimeter 51. Based on the detected usage environment temperature T0, the PC (50) selects the liquid crystal composition exhibiting liquid crystal phase at the environment temperature T0. The PC (50) then outputs a corresponding signal to the waveform generator 49. The waveform generator 49 is connected, via different lines, to the transparent electrode 2a corresponding to the liquid crystal composition A and to the transparent electrode 2a' corresponding to the liquid crystal composition B. The waveform generator 49 operates so as to allow a voltage to be applied to the liquid crystal composition selected by the PC (50).

The above-described present exemplary embodiment can exert effects similar to those of aforementioned exemplary embodiments applied to the present exemplary embodiment. Furthermore, the present exemplary embodiment allows a voltage to be reliably applied only to the liquid crystal composition exhibiting liquid crystal phase. Thus, display quality can be prevented from being degraded by application of a voltage to the liquid crystal composition during a phase transition.

The arrangements and operations of the present exemplary embodiment other than those described above are similar to the corresponding arrangements and operations of the above-described first to seventh exemplary embodiments.

Ninth Exemplary Embodiment

Now, a ninth exemplary embodiment of the invention will be described with reference to FIG. 26. The present exemplary embodiment is another method for driving a liquid crystal display device with the liquid crystal display element according to any one of the above-described exemplary embodiments.

Figure 26:
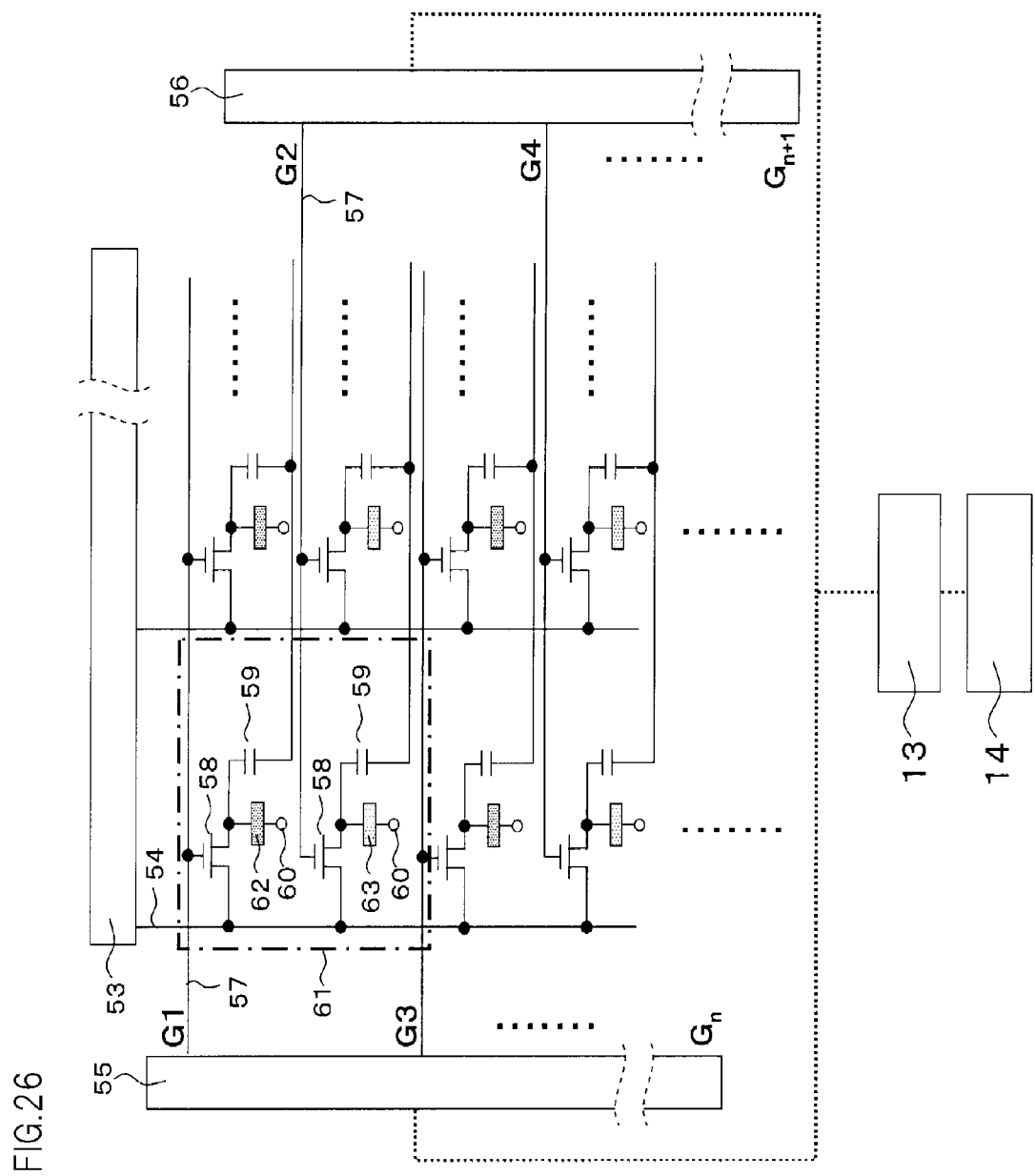
FIG. 26 is a diagram of a TFT circuit in a liquid crystal display device according to a ninth exemplary embodiment of the invention.

FIG. 26 is a diagram of a TFT circuit in the liquid crystal display device according to the present exemplary embodiment. In the present exemplary embodiment, each liquid crystal composition group includes the area of liquid crystal composition A and the area of liquid crystal composition B. As shown in FIG. 26, a TFT 58 is present within one pixel area 61 for each liquid crystal composition so as to allow an on voltage or an off voltage to be applied for each liquid crystal composition.

An electrode selection circuit 13 connected to a temperature sensor 14 is also connected to a gate electrode drive circuit I (55) and a gate electrode drive circuit II (56). The gate electrode drive circuit I (55) applies the on or off voltage, via a gate electrode wire 57, to the TFT 58 connected to a liquid crystal capacity 62 containing the liquid crystal composition A. The gate electrode drive circuit II (56) applies the on or off voltage, via another gate electrode wire 57, to the TFT 58 connected to a liquid crystal capacity 63 containing the liquid crystal composition B.

A data electrode drive circuit 53 is connected to each of the TFT 58 via a data electrode wire 54.

For example, if the electrode selection circuit 13 selects only the liquid crystal composition A based on the usage environment temperature detected by the temperature sensor 14, an on signal is transmitted to the gate electrode drive circuit I (55). The on voltage is then applied, via the gate electrode wire 57 to the TFT 58, which is thus turned on. Then, between the TFT-side electrode and a common electrode 60 on an opposite substrate, the voltage is applied to the liquid crystal capacity 62 containing the liquid crystal composition A. At the same time, the voltage is also applied to a storage capacity 59 connected in parallel with the liquid crystal capacity 62 containing the liquid crystal composition A. When the TFT 58 is turned off, the voltages written to the liquid crystal capacity 62 containing the liquid crystal composition A and to the storage capacity 59 are maintained. On the other hand, an off signal is transmitted to the gate electrode drive circuit II (56) to turn off the TFT 58. No voltage is applied to the liquid crystal capacity 63 containing the liquid crystal composition B. A similar operation is performed as follows. If the electrode selection circuit 13 selects only the liquid crystal composition B, the voltage is applied only to the liquid crystal capacity 63 containing the liquid crystal composition B. If the electrode selection circuit 13 selects both the liquid crystal compositions A and B, the voltage is applied to both the liquid crystal capacities.

The above-described present exemplary embodiment can exert effects similar to those of the eighth exemplary embodiment.

The arrangements and operations of the present exemplary embodiment other than those described above are similar to the corresponding arrangements and operations of the above-described first to seventh exemplary embodiments.

A capacity system for the TFT may be an additional capacity system instead of the storage capacity system. Furthermore, the TFT may be of a driver integrated type.

Tenth Exemplary Embodiment

Now, a tenth exemplary embodiment of the invention will be described with reference to FIG. 27. The present exemplary embodiment is another method for driving a liquid crystal display device with the liquid crystal display element according to any one of the above-described exemplary embodiments. The present exemplary embodiment is different from the ninth exemplary embodiment in the operation of the TFT circuit.

Figure 27:
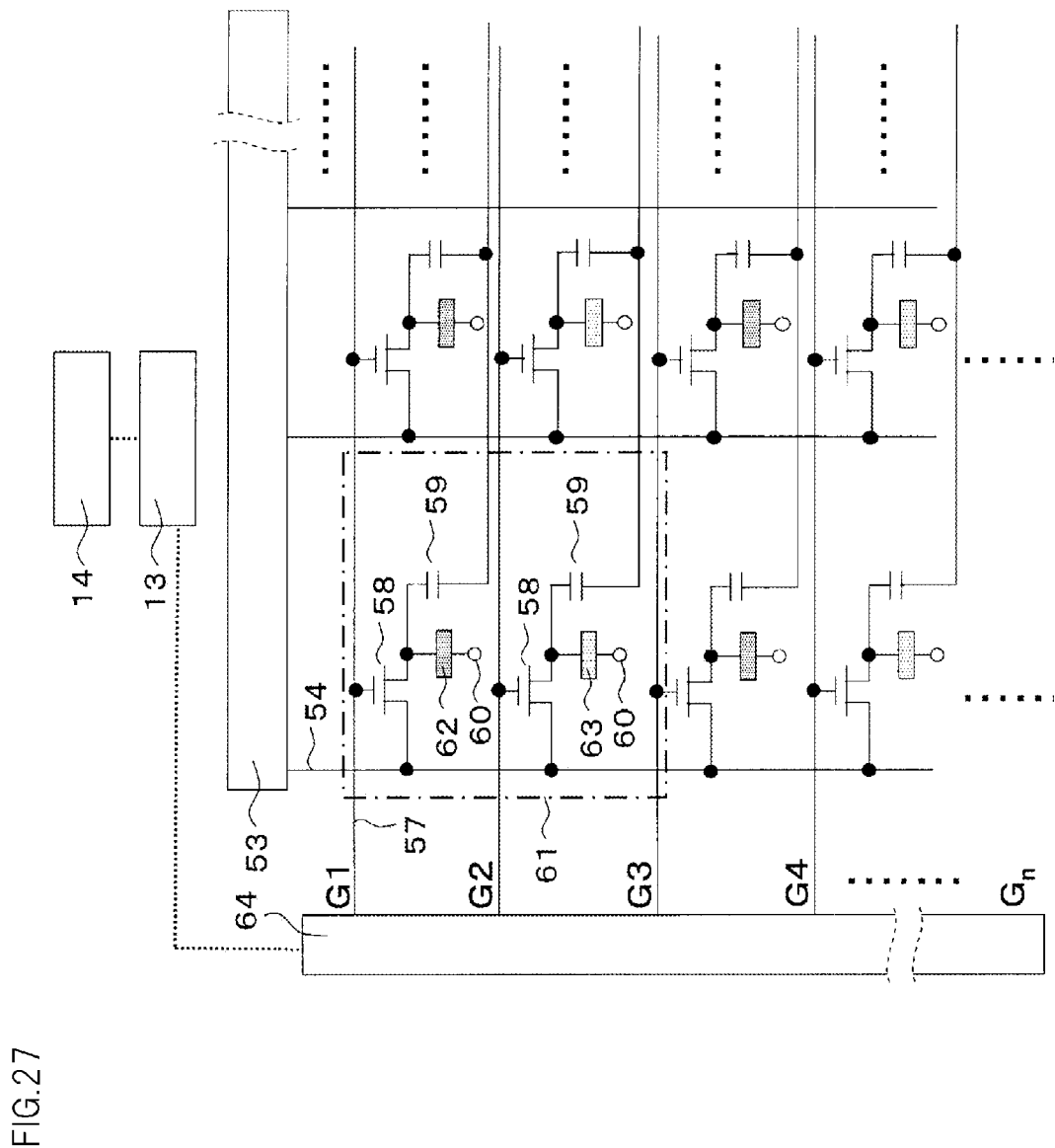
FIG. 27 is a diagram of a TFT circuit in a liquid crystal display device according to a tenth exemplary embodiment of the invention.

FIG. 27 is a diagram of a TFT circuit in the liquid crystal display device according to the present exemplary embodiment. In the present exemplary embodiment, as in the case of the ninth exemplary embodiment, each liquid crystal composition group includes the area of liquid crystal composition A and the area of liquid crystal composition B. As shown in FIG. 27, a TFT 58 is present within one pixel area 61 for each liquid crystal composition so as to allow an on voltage or an off voltage to be applied for each liquid crystal composition.

An electrode selection circuit 13 connected to a temperature sensor 14 is also connected to a gate electrode drive circuit 64. The gate electrode drive circuit 64 applies the on or off voltage to each of the TFTs 58 via a gate electrode wire 57. The odd-numbered gate electrode wire 57 is located so as to allow the on or off voltage to be applied to the TFT 58 connected to the liquid crystal capacity 62 containing the liquid crystal composition A. The even-numbered gate electrode wire 57 is located so as to allow the on or off voltage to be applied to the TFT 58 connected to the liquid crystal capacity 63 containing the liquid crystal composition B.

A data electrode drive circuit 53 is connected to each of the TFTs 58 via a data electrode wire 54.

For example, if the electrode selection circuit 13 selects only the liquid crystal composition A based on the usage environment temperature detected by the temperature sensor 14, the gate electrode drive circuit 64 applies the on voltage, via the odd-numbered gate electrode wire 57, to the TFT 58 connected to the liquid crystal capacity 62 containing the liquid crystal composition A. The gate electrode drive circuit 64 applies the off voltage, via the even-numbered gate electrode wire 57, to the TFT 58 connected to the liquid crystal capacity 63 containing the liquid crystal composition B.

A similar operation is performed as follows. If the electrode selection circuit 13 selects only the liquid crystal composition B, the gate electrode drive circuit 64 applies the on voltage, via the even-numbered gate electrode wire 57, to the TFT 58 connected to the liquid crystal capacity 63 containing the liquid crystal composition B. The gate electrode drive circuit 64 applies the off voltage, via the odd-numbered gate electrode wire 57, to the TFT 58 connected to the liquid crystal capacity 62 containing the liquid crystal composition A. If the electrode selection circuit 13 selects both the liquid crystal compositions A and B, the gate electrode drive circuit 64 applies the on voltage to the TFT 58 connected to both the liquid crystal capacities.

The above-described present exemplary embodiment can exert effects similar to those of the eighth exemplary embodiment.

The arrangements and operations of the present exemplary embodiment other than those described above are similar to the corresponding arrangements and operations of the above-described first to seventh exemplary embodiments.

Eleventh Exemplary Embodiment

Now, an eleventh exemplary embodiment of the invention will be described with reference to FIG. 28. The present exemplary embodiment is another method for driving a liquid crystal display device with the liquid crystal display element according to any one of the above-described exemplary embodiments. The present exemplary embodiment is different from the ninth and tenth exemplary embodiments in the operation of the TFT circuit.

Figure 28:
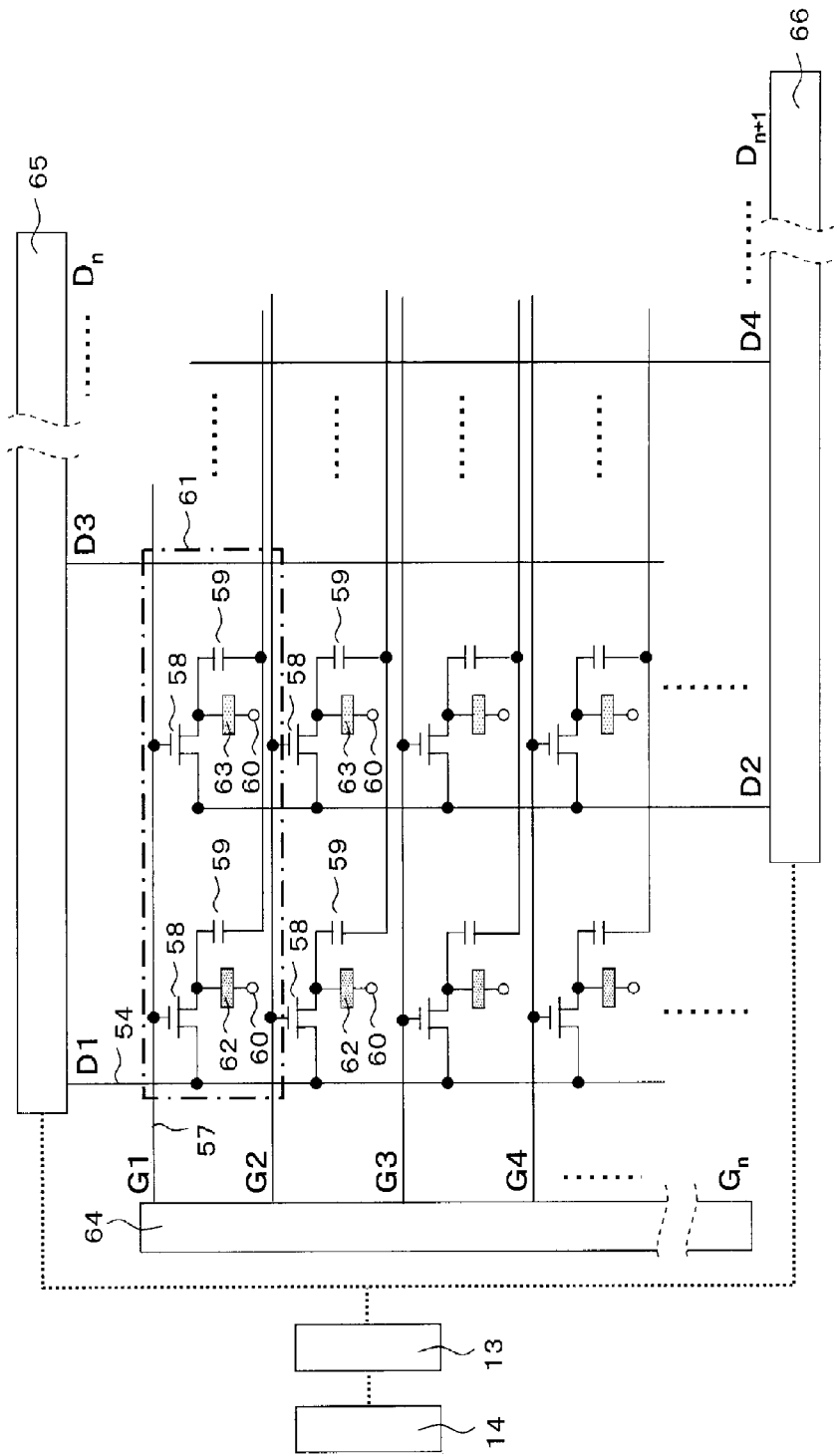
FIG. 28 is a diagram of a TFT circuit in a liquid crystal display device according to an eleventh exemplary embodiment of the invention.

FIG. 28 is a diagram of a TFT circuit in the liquid crystal display device according to the present exemplary embodiment. In the present exemplary embodiment, as in the case of the ninth exemplary embodiment, each liquid crystal composition group includes the area of liquid crystal composition A and the area of liquid crystal composition B. As shown in FIG. 28, a TFT 58 is present within one pixel area 61 for each liquid crystal composition so as to allow an on voltage or an off voltage to be applied for each liquid crystal composition.

An electrode selection circuit 13 connected to a temperature sensor 14 is also connected to a data electrode drive circuit I (65) and a data electrode drive circuit II (66). The data electrode drive circuit I (65) is connected, via a data electrode wire 54, to each of the TFTs 58 connected to the liquid crystal capacity 62 containing the liquid crystal composition A. The data electrode drive circuit II (66) is connected, via another data electrode wire 54, to each of the TFTs 58 connected to the liquid crystal capacity 63 containing the liquid crystal composition B.

A gate electrode drive circuit 64 is connected to each of the TFTs 58 via a gate electrode wire 57.

For example, if the electrode selection circuit 13 selects only the liquid crystal composition A based on the usage environment temperature detected by the temperature sensor 14, a signal is transmitted to the data electrode drive circuit I (65). The data electrode drive circuit I (65) transmits a data signal for a pixel to be displayed, via the data electrode wire 54, to the liquid crystal capacity 62 containing the liquid crystal composition A. As a result, only the area of liquid crystal composition A displays pixel data. On the other hand, no signal is transmitted to the data electrode drive circuit II (66). Hence, the area of liquid crystal composition B is not driven. A similar operation is performed as follows. If the electrode selection circuit 13 selects only the liquid crystal composition B, a pixel data signal is transmitted to the liquid crystal capacity 63 containing the liquid crystal composition B. No pixel data signal is transmitted to the liquid crystal capacity 62 containing the liquid crystal composition A. If the electrode selection circuit 13 selects both the liquid crystal compositions A and B, a pixel data signal is transmitted to both the liquid crystal capacities.

The above-described present exemplary embodiment can exert effects similar to those of the eighth exemplary embodiment.

The arrangements and operations of the present exemplary embodiment other than those described above are similar to the corresponding arrangements and operations of the above-described first to seventh exemplary embodiments.

Twelfth Exemplary Embodiment

Now, a twelfth exemplary embodiment of the invention will be described with reference to FIG. 29. The present exemplary embodiment is another method for driving a liquid crystal display device with the liquid crystal display element according to any one of the above-described exemplary embodiments. The present exemplary embodiment is different from the ninth to eleventh exemplary embodiments in the operation of the TFT circuit.

Figure 29:
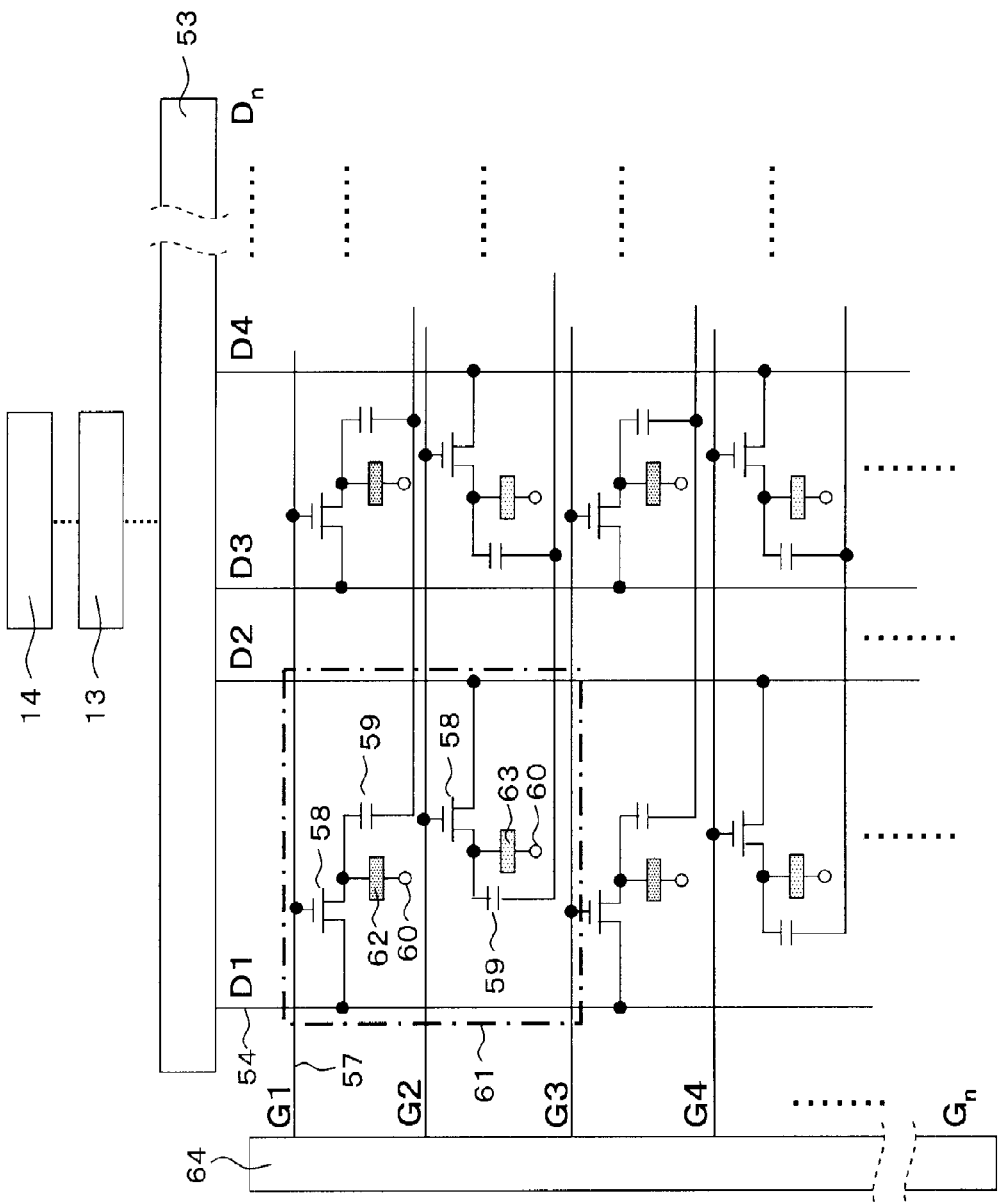
FIG. 29 is a diagram of a TFT circuit in a liquid crystal display device according to a twelfth exemplary embodiment of the invention.

FIG. 29 is a diagram of a TFT circuit in the liquid crystal display device according to the present exemplary embodiment. In the present exemplary embodiment, as in the case of the ninth exemplary embodiment, each liquid crystal composition group includes the area of liquid crystal composition A and the area of liquid crystal composition B. As shown in FIG. 29, a TFT 58 is present within one pixel area 61 for each liquid crystal composition so as to allow an on voltage or an off voltage to be applied for each liquid crystal composition.

An electrode selection circuit 13 connected to a temperature sensor 14 is also connected to a data electrode drive circuit 53. The data electrode drive circuit 53 is connected to each of the TFTs 58 via a data electrode wire 54. The odd-numbered data electrode wire 54 is connected to the TFT 58 connected to the liquid crystal capacity 62 containing the liquid crystal composition A. An even-numbered data electrode wire 54 is connected to the TFT 58 connected to the liquid crystal capacity 63 containing the liquid crystal composition B.

A gate electrode drive circuit 64 applies an on voltage or an off voltage to each TFT via a gate electrode wire 57.

For example, if an electrode selection circuit 13 selects only the liquid crystal composition A based on the usage environment temperature detected by a temperature sensor 14, the data electrode drive circuit 53 transmits a data signal for a pixel to be displayed, via the odd-numbered data electrode wire 54, to the liquid crystal capacity 62 containing the liquid crystal composition A. As a result, only the area of liquid crystal composition A displays pixel data. On the other hand, no signal is transmitted to the even-numbered data electrode wire 54. Hence, the area of liquid crystal composition B is not driven. A similar operation is performed as follows. If the electrode selection circuit 13 selects only the liquid crystal composition B, a pixel data signal is transmitted to the liquid crystal capacity 63 containing the liquid crystal composition B. No pixel data signal is transmitted to the liquid crystal capacity 62 containing the liquid crystal composition A. If the electrode selection circuit 13 selects both the liquid crystal compositions A and B, a pixel data signal is transmitted to both the liquid crystal capacities.

The above-described present exemplary embodiment can exert effects similar to those of the eighth exemplary embodiment.

The arrangements and operations of the present exemplary embodiment other than those described above are similar to the corresponding arrangements and operations of the above-described first to seventh exemplary embodiments.

Thirteenth Exemplary Embodiment

Now, a thirteenth exemplary embodiment of the invention will be described with reference to FIG. 30 to FIG. 33. The present exemplary embodiment is another method for driving a liquid crystal display device with the liquid crystal display element according to any one of the above-described exemplary embodiments.

Figure 30:
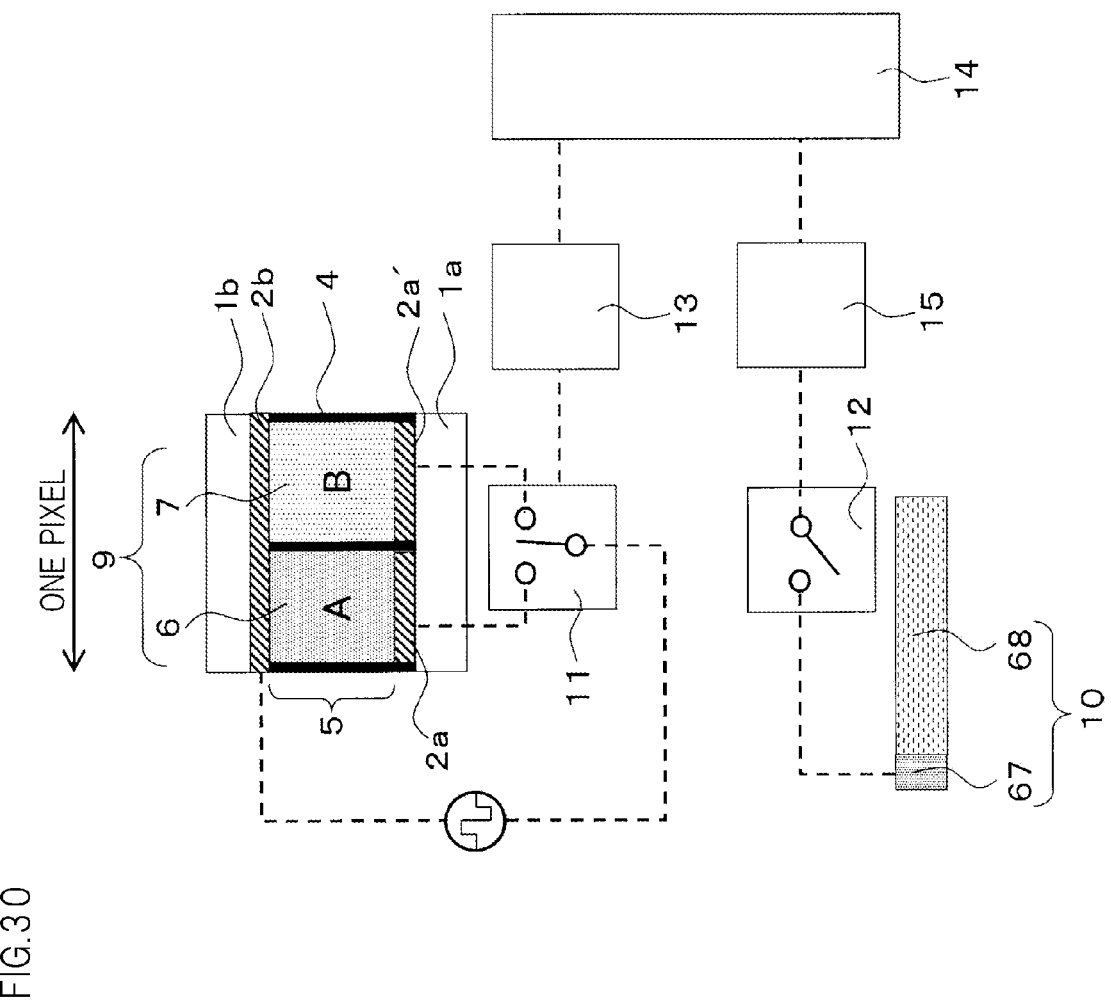
FIG. 30 is a schematic diagram illustrating a method for driving a liquid crystal display device according to a thirteenth exemplary embodiment of the invention.

FIG. 30 is a schematic diagram illustrating a method for driving the liquid crystal display device according to the present exemplary embodiment. As shown in FIG. 30, the liquid crystal display device according to the present exemplary embodiment includes the liquid crystal display element, a backlight 10, a liquid crystal drive circuit 11, and a light source drive circuit 12. An electrode selection circuit 13 is connected to the liquid crystal drive circuit 11. A temperature sensor 14 is connected to the electrode selection circuit 13. A light quantity adjustment circuit 15 with a function to convert voltage into current is connected to the light source drive circuit 12. The temperature sensor 14 is connected to the light quantity adjustment circuit 15. The backlight 10 includes a light source 67 and a light guide plate 68. The light source drive circuit 12 is connected to the light source 67.

The temperature sensor 14 detects the usage environment temperature T0 and then outputs a signal indicating the usage environment temperature T0. The signal is input to the electrode selection circuit 13 and the light quantity adjustment circuit 15. The electrode selection circuit 13 compares the usage environment temperature T0 with a liquid crystal phase temperature range (in this case, a temperature Ti) for the liquid crystal composition group 9 which is preset as a reference. The electrode selection circuit 13 selects at least one type of liquid crystal composition to be driven and then outputs a corresponding signal to the liquid crystal drive circuit 11. At the same time, the light quantity adjustment circuit 15 outputs an appropriate current value in accordance with the usage environment temperature T0 detected by the temperature sensor 14. In accordance with the current value, the light source drive circuit 12 drives the light source 67.

Figure 31:
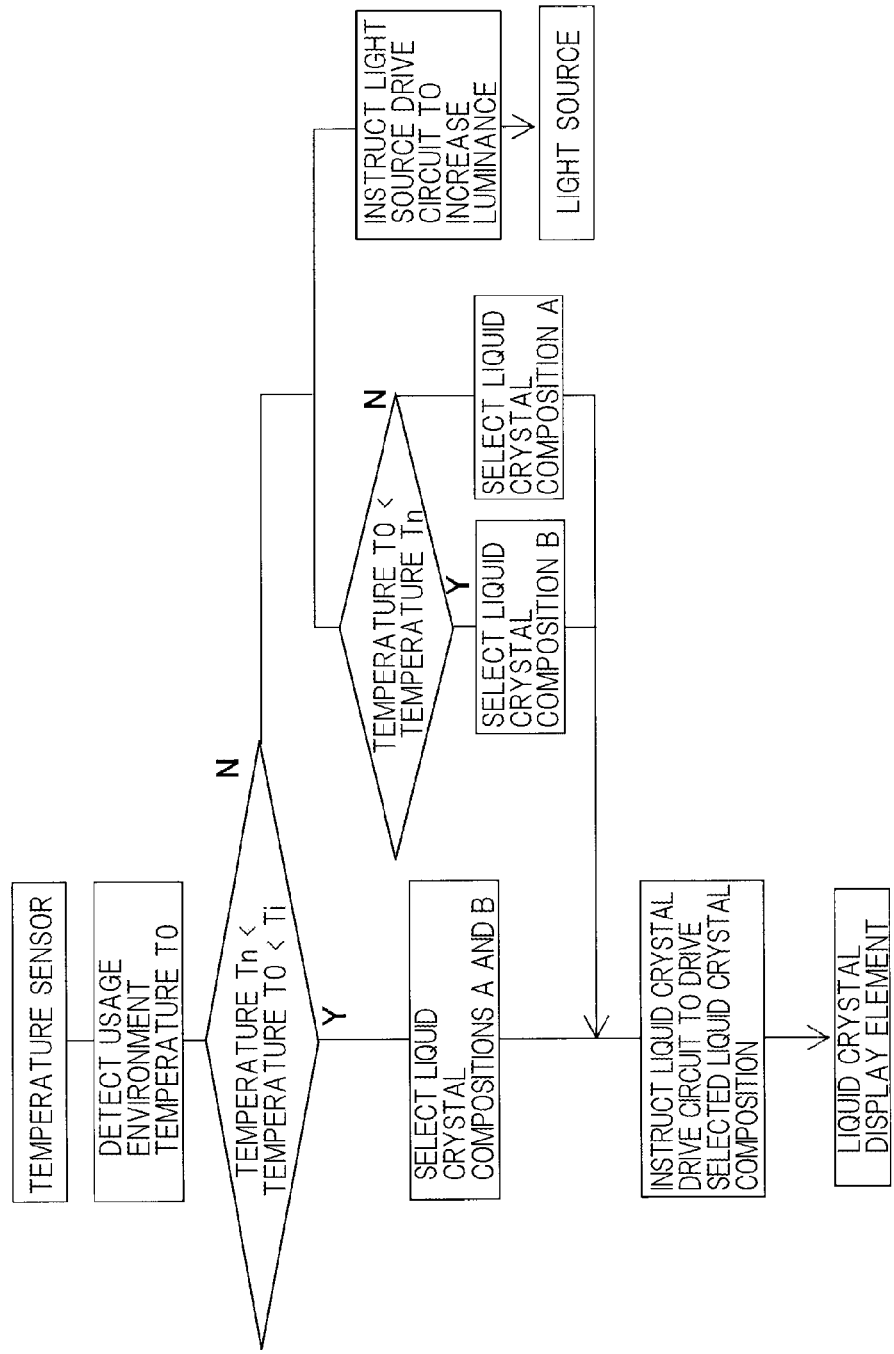
FIG. 31 is a flowchart illustrating processing executed by the liquid crystal display device according to the thirteenth exemplary embodiment of the invention.

FIG. 31 is a flowchart illustrating processing executed by the liquid crystal display device according to the present exemplary embodiment. As shown in FIG. 31, first, the temperature sensor 14 detects and outputs the usage environment temperature T0 to the electrode selection circuit 13. The electrode selection circuit 13 compares the usage environment temperature T0 with a liquid crystal phase temperature range (in this case, temperatures Tn and Ti) for the liquid crystal composition group 9 which is preset as a reference. If the usage environment temperature T0 is higher than the temperature Tn and lower than the temperature Ti, the electrode selection circuit 13 selects both the liquid crystal compositions A and B. If the electrode selection circuit 13 selects one of the liquid crystal compositions A and B, the light quantity adjustment circuit 15 simultaneously outputs a signal for an increase in the luminance of the light source 67, to the light source drive circuit 12. Light emitted by the light source 67 enters the light guide plate 68 and is then emitted to the liquid crystal display element. When T0 is lower than Tn, the liquid crystal composition B is selected. When T0 is not lower than Tn (Ti<T0), the liquid crystal composition A is selected.

Figures 32, 33:
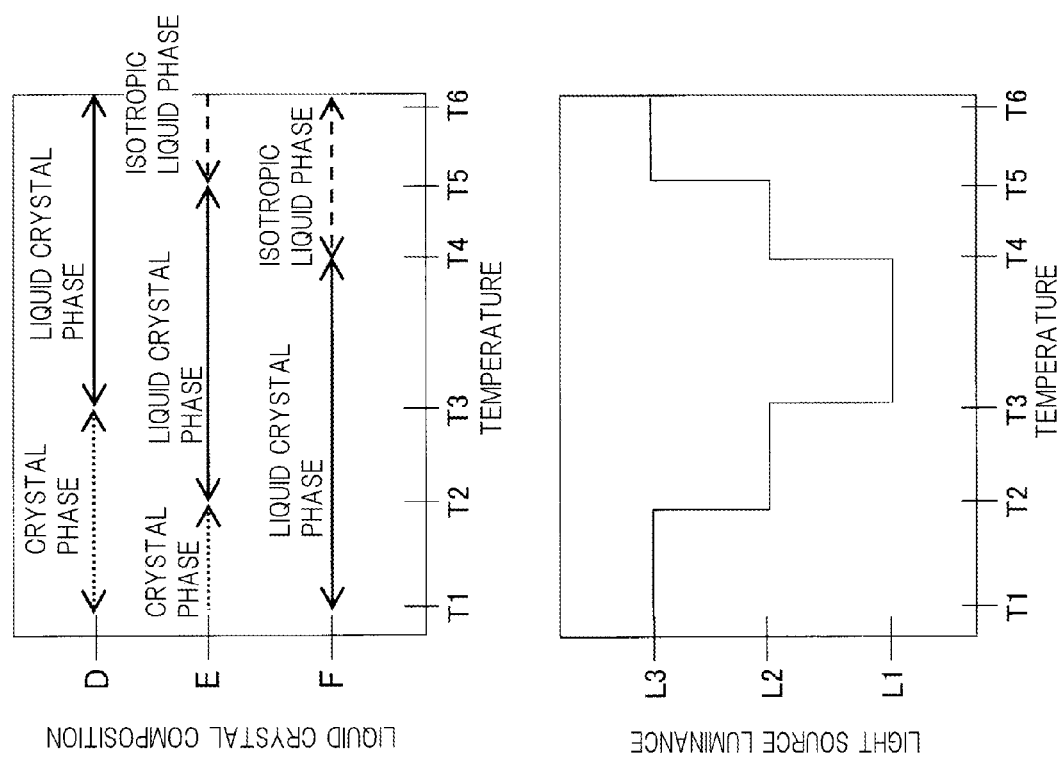
FIG. 32 is a phase diagram of liquid crystal compositions used in the liquid crystal display device according to the thirteenth exemplary embodiment of the invention.
FIG. 33 is a diagram showing the luminance of a light source for the liquid crystal display device according to the thirteenth exemplary embodiment of the invention.
Figure 34:
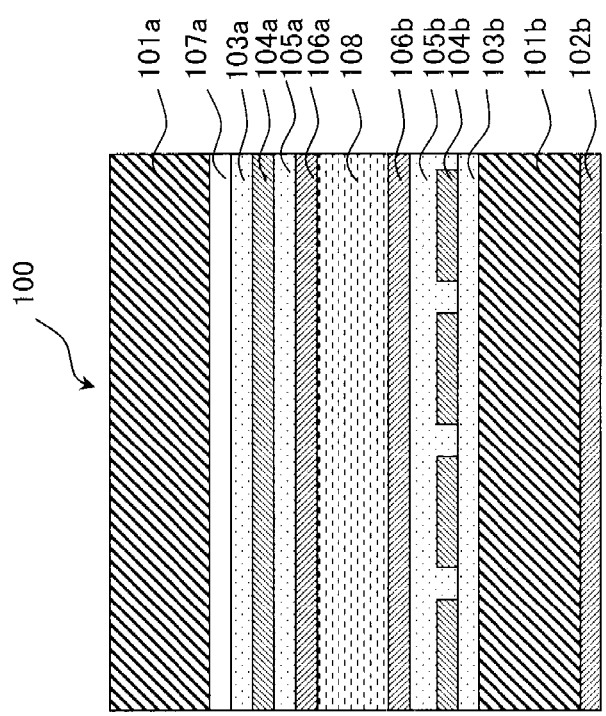
FIG. 34 is a diagram showing a related display device.

FIG. 32 is a phase diagram of the liquid crystal compositions used in the liquid crystal display device according to the present exemplary embodiment. FIG. 33 is a diagram showing the luminance of the light source in the liquid crystal display device according to the present exemplary embodiment. Temperature T meets the condition T1<T2<T3<T4<T5<T6. Light source luminance L meets the condition L1<L2<L3.

For example, if the liquid crystal composition group according to the present exemplary embodiment includes three types of liquid crystal compositions such as those shown in FIG. 32, the following process can be carried out as shown in FIG. 33. Within the range between the temperature T1 and the temperature T2 in which only a liquid crystal composition F is selected, the light source luminance can be increased to L3. Within the range between the temperature T2 and the temperature T3 in which a liquid crystal composition E and the liquid crystal composition F are selected, the light source luminance can be increased to L2. Within the range between the temperature T3 and the temperature T4 in which all of the liquid crystal composition group is selected, the light source luminance can be reduced to L1. Furthermore, within the range between the temperature T4 and the temperature T5 in which the liquid crystal composition E and a liquid crystal composition D are selected, the light source luminance can be increased to L2. Within the range between the temperature T5 and the temperature T6 in which only the liquid crystal composition D is selected, the light source luminance can be increased further to L3.

Examples of liquid crystal compositions satisfying the characteristics shown in FIG. 32 are as follows. The liquid crystal composition D may be 4-(4-n-penthylphenyl) benzoic acid-4'-n-pentylphenyl ester (liquid crystal phase temperature range: between 95° C. and 176° C.). The liquid crystal composition E may be N-(4-butanoyloxybenzylidene)-4-methoxyaniline (liquid crystal phase temperature range: between 86° C. and 119° C.). The liquid crystal composition F may be N-(4-methoxybenzylidene)-4-butanoyloxyaniline (liquid crystal phase temperature range: between 49° C. and 113° C.).

The above-described present exemplary embodiment can exert effects similar to those of the eighth to twelfth exemplary embodiments. Furthermore, according to the present exemplary embodiment, if there is an undriven liquid crystal composition, the display luminance can be maintained by adjusting the luminance of the light source 67 of the backlight 10. Furthermore, when the most frequently used temperature range is preset to the range between the temperature T3 and the temperature T4 within which the all of the liquid crystal compositions are selected, the need for a frequent increase in light source luminance is eliminated. This enables driving with reduced power consumption.

The arrangements and operations of the present exemplary embodiment other than those described above are similar to the corresponding arrangements and operations of the above-described eighth to twelfth exemplary embodiments.

Any of various correction layers such as a diffusion sheet and a lens sheet may be provided in the backlight.

Fourteenth Exemplary Embodiment

Now, a fourteenth exemplary embodiment of the invention will be described. The present exemplary embodiment is a liquid crystal display element suitable for the above-described eighth to thirteenth exemplary embodiments.

If a liquid crystal composition group 9 includes the area 6 of a liquid crystal composition A and the area 7 of a liquid crystal composition B, MLC6608 (manufactured by Merck KGaA) is used as the liquid crystal composition A. MLC6608 into which 5 wt % of UV curable liquid crystal (UCL-001-K1; manufactured by DIC Corporation) with a photopolymerization initiator added thereto is mixed is used as the liquid crystal composition B.

Then, a liquid crystal-containing layer structure with a cell gap of 3 μm is produced by the manufacturing method described in the first exemplary embodiment. The liquid crystal compositions A and B are injected by the liquid crystal composition injection method described in the first exemplary embodiment and is then sealed. Thereafter, only the liquid crystal composition B mixed with the UV curable liquid crystal is irradiated with ultraviolet rays using a mask and so on, and thus formed into a polymer network. An ultraviolet irradiation intensity is 2.73 mW/cm$^2$, and an irradiation time is 20 minutes. Prolonged exposure with a reduced ultraviolet irradiation intensity allows the dispersibility of the polymer to be improved. The liquid crystal composition B formed into a polymer network has a higher response speed than the liquid crystal composition A not formed into a polymer network owing to the restraining force of the polymer. Particularly in a low-temperature environment at about −20° C., a fall speed is advantageously reduced to a quarter.

The thus formed liquid crystal display element can be applied to the above-described exemplary embodiments, and can operate in accordance with the driving method described in the eighth to thirteenth exemplary embodiments. That is, the liquid crystal display element can selectively drive the liquid crystal composition A or both the liquid crystal compositions A and B at the room temperature and only the liquid crystal composition B at low temperature. Thus, stable display quality can be obtained over a wide temperature range.

The above-described present exemplary embodiment can exert effects similar to those of the eighth to thirteenth exemplary embodiments.

The arrangements and operations of the present exemplary embodiment other than those described above are similar to the corresponding arrangements and operations of the above-described eighth to thirteenth exemplary embodiments.

Furthermore, the combination of the liquid crystal composition and the polymer composition is not limited to the above-described example. Instead of the polymer composition, a low-molecular gelator may be used. A combination of the liquid crystal composition and the low-molecular gelator allows self-organized formation of fibers. This eliminates the need for the exposure step, thus enabling the process to be shortened.

In further exemplary embodiment 1, there is provided a liquid crystal display element including a liquid crystal composition sandwiched between substrates, wherein at least two types of liquid crystal compositions which exhibit liquid crystal phase in different temperature ranges are contained within each one pixel, and each of the at least two types of liquid crystal compositions is sealed and isolated within each pixel.

In the above-described liquid crystal display element, each of the at least two types of liquid crystal compositions may exhibit liquid crystal phase within a temperature range partly overlapping a temperature range within which another type of liquid crystal composition within the same pixel exhibits liquid crystal phase.

In the above-described liquid crystal display element, each of the at least two types of liquid crystal compositions may be accommodated in a corresponding one of cells partitioned by partition walls.

In this case, preferably, the at least two types of liquid crystal compositions are arranged between the paired substrates in a planar direction of the substrates. Preferably, a partial electrode corresponding to each of the cells within each pixel is provided on at least one of the paired substrates. Preferably, the partial electrodes are separated from one another such that within one pixel, each one of the partial electrodes is drivable independently of another partial electrode corresponding to the cell in which the different type of liquid crystal composition from the liquid crystal composition in the cell corresponding to the former partial electrode is accommodated. An electrode opposite to each of the partial electrodes may be provided on the other substrate opposite to the substrate with the partial electrodes provided thereon.

Alternatively, the at least two types of liquid crystal compositions may be arranged such that liquid crystal compositions of the same type are arranged at intervals in the planar direction of the substrates to form liquid crystal composition array layers, the number of the liquid crystal composition array layers being the same as the number of the types of liquid crystal compositions. The liquid crystal composition array layers may be stacked without overlapping the liquid crystal compositions each other. An independently drivable electrode may be provided to each of the liquid crystal composition array layers.

In the above-described liquid crystal display element, each of the at least two types of liquid crystal compositions may be accommodated in a microcapsule.

In the above-described liquid crystal display element, one of the at least two types of liquid crystal compositions may be a liquid crystal composition obtained by photopolymerizing a composition comprising the same type of liquid crystal composition as another type of liquid crystal composition within the same pixel and a photopolymerizable liquid crystal material.

In further exemplary embodiment 2, there is provided a liquid crystal display device including:

the above-described liquid crystal display element (according to further exemplary embodiment 1);

a backlight;

a temperature sensor; and a liquid crystal drive circuit configured to controllably drive each of the liquid crystal compositions in the liquid crystal display element based on a signal output by the temperature sensor.

In the liquid crystal display element in the liquid crystal display device, each of the at least two types of liquid crystal compositions may be accommodated in a corresponding one of cells partitioned by partition walls.

In this case, preferably, the at least two types of liquid crystal compositions are arranged between the paired substrates in a planar direction of the substrates. Preferably, a partial electrode corresponding to each of the cells within each pixel is provided on at least one of the paired substrates. Preferably, the partial electrodes are separated from one another such that within one pixel, each one of the partial electrodes is drivable independently of another partial electrode corresponding to the cell in which the different type of liquid crystal composition from the liquid crystal composition in the cell corresponding to the former partial electrode is accommodated. An electrode opposite to each of the partial electrodes may be provided on the other substrate opposite to the substrate with the partial electrodes provided thereon.

Alternatively, the at least two types of liquid crystal compositions may be arranged such that liquid crystal compositions of the same type are arranged at intervals in the planar direction of the substrates to form liquid crystal composition array layers, the number of the liquid crystal composition array layers being the same as the number of the types of liquid crystal compositions. The liquid crystal composition array layers may be stacked without overlapping the liquid crystal compositions each other. An independently drivable electrode may be provided to each of the liquid crystal composition array layers.

The liquid crystal display device may include a light source drive circuit configured to control luminance of a light source for the backlight based on a signal output by the temperature sensor.

The liquid crystal display device may include a color filter, and the at least two types of liquid crystal compositions may be arranged in each subpixel.

In this case, the liquid crystal display device may include a correction layer configured to correct a phase difference between one liquid crystal composition and another type of liquid crystal composition within each subpixel. Alternatively, the color filter may include a correction area configured to correct a phase difference between one liquid crystal composition and another type of liquid crystal composition within each subpixel.

In further exemplary embodiment 3, there is provided a method for driving a liquid crystal display device, wherein the device includes the above-described liquid crystal display element (according to further exemplary embodiment 1), a backlight, a temperature sensor, and a liquid crystal drive circuit configured to controllably drive each of the liquid crystal compositions in the liquid crystal display element based on a signal output by the temperature sensor, and the method includes detecting a usage environment temperature by using the temperature sensor, and selecting and driving at least one type of liquid crystal composition which exhibits liquid crystal phase at the usage environment temperature.

In the driving method, each of the at least two types of liquid crystal compositions may be accommodated in a corresponding one of cells partitioned by partition walls.

In this case, preferably, the at least two types of liquid crystal compositions are arranged between the paired substrates in a planar direction of the substrates. Preferably, a partial electrode corresponding to each of the cells within each pixel is provided on at least one of the paired substrates. Preferably, the partial electrodes are separated from one another such that within one pixel, each one of the partial electrodes is drivable independently of another partial electrode corresponding to the cell in which the different type of liquid crystal composition from the liquid crystal composition in the cell corresponding to the former partial electrode is accommodated. An electrode opposite to each of the partial electrodes may be provided on the other substrate opposite to the substrate with the partial electrodes provided thereon.

Alternatively, the at least two types of liquid crystal compositions may be arranged such that liquid crystal compositions of the same type are arranged at intervals in the planar direction of the substrates to form liquid crystal composition array layers, the number of the liquid crystal composition array layers being the same as the number of the types of liquid crystal compositions. The liquid crystal composition array layers may be stacked without overlapping the liquid crystal compositions each other. An independently drivable electrode may be provided to each of the liquid crystal composition array layers.

In the above-described driving method, each of the at least two types of liquid crystal compositions may exhibit liquid crystal phase within a temperature range partly overlapping a temperature range within which another type of liquid crystal composition within the same pixel exhibits liquid crystal phase. The liquid crystal display device may further include a light source drive circuit configured to control luminance of a light source for the backlight based on a signal output by the temperature sensor. The method may includes controlling to increase the luminance of the light source by using the light source drive circuit if any of the liquid crystal compositions is not driven at the usage environment temperature.

An exemplary advantage according to the invention is to provide a liquid crystal display element that is unlikely to be affected by a variation in temperature even in various temperature environments, thus allowing stable display quality to be maintained, as well as a display device including the liquid crystal display element and a method for driving the display device.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the invention as defined by the claims.

What is claimed is:

1. A liquid crystal display element comprising a liquid crystal composition sandwiched between substrates,
    wherein at least two types of liquid crystal compositions which exhibit liquid crystal phase in different temperature ranges are contained within each one pixel,
    each of the at least two types of liquid crystal compositions is sealed and isolated within each pixel,
    each of the at least two types of liquid crystal compositions is accommodated in a corresponding one of cells partitioned by partition walls,
    the at least two types of liquid crystal compositions are arranged such that liquid crystal compositions of the same type are arranged at intervals in the planar direction of the substrates to form liquid crystal composition array layers, the number of the liquid crystal composition array layers being the same as the number of the types of liquid crystal compositions,
    the liquid crystal composition array layers are stacked without overlapping the liquid crystal compositions each other, and
    an independently drivable electrode is provided to each of the liquid crystal composition array layers.

2. The liquid crystal display element according to claim 1, wherein each of the at least two types of liquid crystal compositions exhibits liquid crystal phase within a temperature range partly overlapping a temperature range within which another type of liquid crystal composition within the same pixel exhibits liquid crystal phase.

3. The liquid crystal display element according to claim 1, wherein one of the at least two types of liquid crystal compositions is a liquid crystal composition obtained by photopolymerizing a composition comprising the same type of liquid crystal composition as another type of liquid crystal composition within the same pixel and a photopolymerizable liquid crystal material.

4. A liquid crystal display device comprising:
    the liquid crystal display element as recited in claim 1;
    a backlight;
    a temperature sensor; and
    a liquid crystal drive circuit configured to controllably drive each of the liquid crystal compositions in the liquid crystal display element based on a signal output by the temperature sensor.

5. The liquid crystal display device according to claim 4, further comprising a light source drive circuit configured to control luminance of a light source for the backlight based on a signal output by the temperature sensor.

6. The liquid crystal display device according to claim 4, further comprising a color filter, wherein the at least two types of liquid crystal compositions are arranged in each subpixel.

7. The liquid crystal display device according to claim 6, further comprising a correction layer configured to correct a phase difference between one liquid crystal composition and another type of liquid crystal composition within each subpixel.

8. The liquid crystal display device according to claim 6, wherein the color filter includes a correction area configured to correct a phase difference between one liquid crystal composition and another type of liquid crystal composition within each subpixel.

9. A method for driving a liquid crystal display device,
    wherein the device comprises the liquid crystal display element as recited in claim 4, a backlight, a temperature sensor, and a liquid crystal drive circuit configured to controllably drive each of the liquid crystal compositions in the liquid crystal display element based on a signal output by the temperature sensor, and
    the method comprises detecting a usage environment temperature by using the temperature sensor, and selecting and driving at least one type of liquid crystal composition which exhibits liquid crystal phase at the usage environment temperature.

10. The method for driving the liquid crystal display device according to claim 9, wherein each of the at least two types of liquid crystal compositions exhibits liquid crystal phase within a temperature range partly overlapping a temperature range within which another type of liquid crystal composition within the same pixel exhibits liquid crystal phase,
    the liquid crystal display device further comprises a light source drive circuit configured to control luminance of a light source for the backlight based on a signal output by the temperature sensor, and
    the method further comprises controlling to increase the luminance of the light source by using the light source drive circuit if any of the liquid crystal compositions is not driven at the usage environment temperature.

* * * * *